US010979733B1

(12) United States Patent
Regunathan et al.

(10) Patent No.: US 10,979,733 B1
(45) Date of Patent: Apr. 13, 2021

(54) SYSTEMS AND METHODS FOR MEASURING IMAGE QUALITY BASED ON AN IMAGE QUALITY METRIC

(71) Applicant: Facebook, Inc., Menlo Park, CA (US)

(72) Inventors: Shankar Lakshmi Regunathan, Redmond, WA (US); Haixiong Wang, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/546,603

(22) Filed: Aug. 21, 2019

(51) Int. Cl.
  *H04N 19/59* (2014.01)
  *H04N 19/593* (2014.01)
  *H04N 19/587* (2014.01)
  *H04N 19/182* (2014.01)

(52) U.S. Cl.
  CPC .......... *H04N 19/59* (2014.11); *H04N 19/182* (2014.11); *H04N 19/587* (2014.11); *H04N 19/593* (2014.11)

(58) Field of Classification Search
  CPC .... H04N 19/59; H04N 19/182; H04N 19/593; H04N 19/587
  See application file for complete search history.

(56) References Cited

U.S. PATENT DOCUMENTS

| 2015/0163273 A1* | 6/2015 | Radcliffe | H04L 47/125 |
| | | | 709/231 |
| 2016/0212432 A1* | 7/2016 | Wang | H04N 19/154 |
| 2017/0359586 A1* | 12/2017 | Xue | H04N 19/17 |

OTHER PUBLICATIONS

Liu (Advances in Neural Networks—ISNN 2011: 8th International Symposium on Neural Networks, ISNN 2011, Guilin, China, May 29-Jun. 1, 2011, Proceedings, Part II; ISBN: 3642210902, 9783642210907). (Year: 2011).*
Gu et al., "Quality Assessment Considering Viewing Distance and Image Resolution", IEEE Transactions on Broadcasting, vol. 61, No. 3, Sep. 2015, pp. 1-12.
Lin et al., "Perceptual visual quality metrics: A survey", J. Vis. Commun. Image R., Jan. 2011, pp. 1-16.

\* cited by examiner

*Primary Examiner* — Nasim N Nirjhar
(74) *Attorney, Agent, or Firm* — FisherBroyles, LLP

(57) ABSTRACT

The disclosed computer-implemented method may include encoding media content into a plurality of encoded media files, each encoded media file having an encoded resolution and at least one associated full reference metric, identifying one of the plurality of encoded media files to provide to a computing device based on at least a playback resolution of a display device included in the computing device, and weighting a measurement of a quality of the encoded media file based on the at least one associated full reference metric and on at least one characteristic associated with the display device. Various other methods, systems, and computer-readable media are also disclosed.

20 Claims, 14 Drawing Sheets

SYSTEMS AND METHODS FOR MEASURING IMAGE QUALITY BASED ON AN IMAGE QUALITY METRIC

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
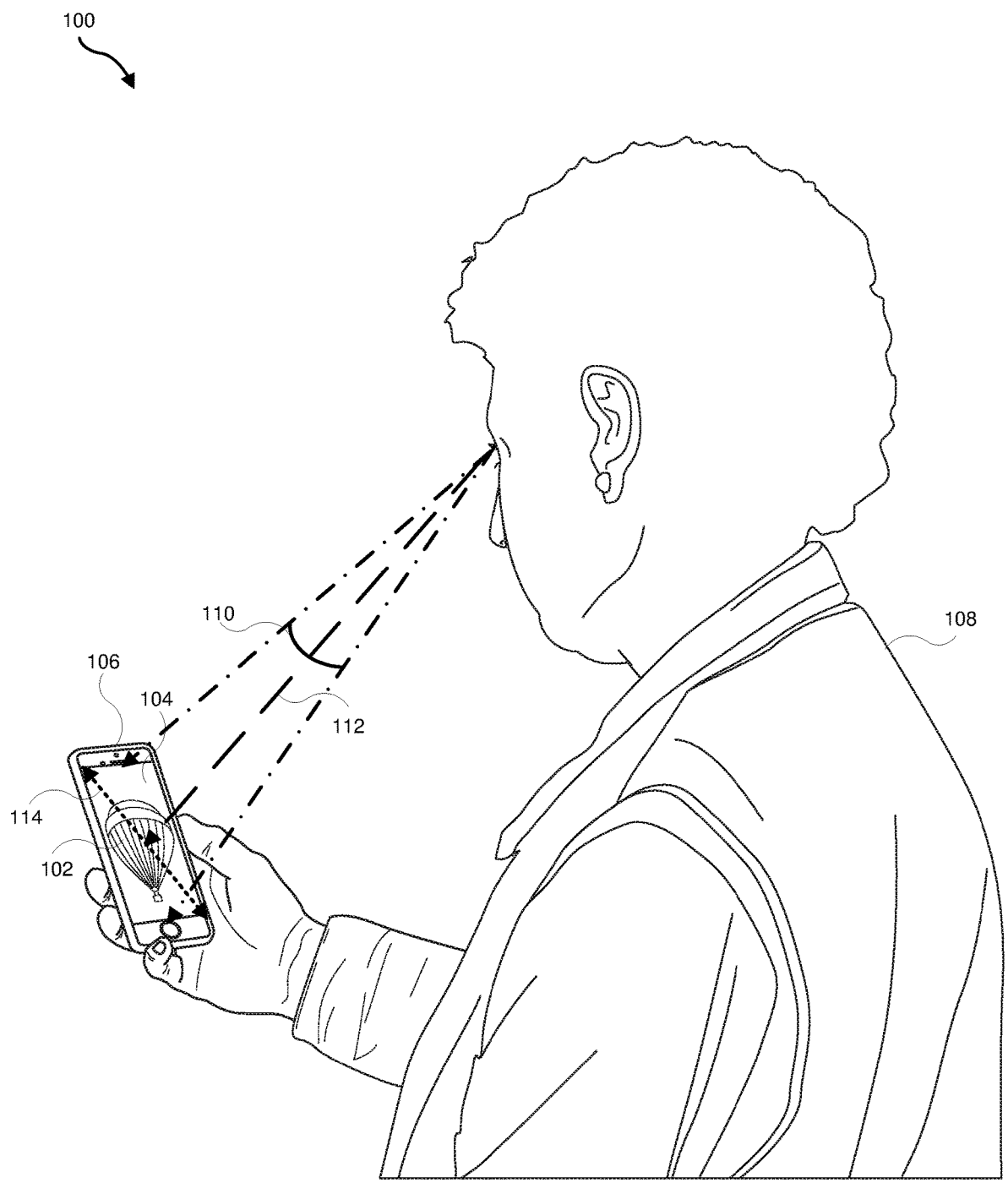
FIG. 1 is a diagram showing media content displayed on a display device of a mobile computing device.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

A user may view streaming media content on many different viewing devices that may include, but are not limited to, a smartphone, a tablet, a laptop computer, a desktop computer, and a high-definition television (HDTV). A user may experience a different viewing experience for the streaming media content dependent on the viewing device. A display device included in each viewing device may be of a different pixel resolution and a different pixel density. In addition, or in the alternative, a user may view the streaming media content on the display device at different distances. The quality of the display device and/or a viewing distance of the user to the display device may affect a perceived quality of the streaming media content as viewed by the user. Described herein are systems and methods for improving the measurement of perceived image quality based on image quality metrics for an encoded image file of an image or for an encoded file for streaming media content.

The present disclosure is generally directed to systems and methods for improvements in the measuring of a mean opinion score of a quality of streaming media content as perceived by a user. As will be explained in greater detail below, embodiments of the present disclosure may provide configurable multi-scale weighting for measuring a mean opinion score of a quality of streaming media content. For example, each streaming media content may be at a different original encoded resolution. In addition, each streaming media content may be viewed on various display devices of different pixel resolution and quality and may be viewed at various distances, in some cases, dependent on a size of the display device. A mean opinion score may be determined for each combination of display quality and viewing distance using configurable multi-scale weighting.

In some implementations, a full reference metric may be computed at each of one or more display device resolutions (pixel-width resolutions (measured in pixels per "x" direction (PPx)), e.g., 360 PPx, 720 PPx, 1080 PPx). A structural similarity index (SSIM) and/or a peak signal-to-noise ratio (PSNR) may be estimated for each display device resolution and stored with an encoding of the streaming content. At delivery time of the streaming media content to a viewing device of a user, a playback resolution for the streaming media content, a resolution of a display device included in the viewing device, and estimated viewing distance for viewing the streaming media content on the viewing device may be determined.

A measurement of a mean opinion score for the streaming media content may be weighted based on a spatial frequency which is a function of the display device resolution divided by the viewing distance of the user to the display device of the viewing device. The weighting may be applied at each scale of a multiscale mean opinion score weighting based on a contrast sensitivity of the display device at a corresponding spatial frequency. For example, a computing device (e.g., a mobile computing device) may include a type of 1080 PPx display device that has a high pixel density (e.g., a pixel density higher than another type of 1080 PPx device). Though two display devices may be of the same size and resolution, one may be of a higher pixel density (one may have a larger number of pixels per centimeter, a larger number of pixels per inch) than the other. In some cases, each of the pixels of the higher pixel density display may not be individually viewed at a typical viewing distance of a user to the computing device, creating a perceived impression of a sharper image as viewed by the user.

A first weighting may be applied to a mean opinion score for streaming media content viewed on the higher pixel density display device of the computing device based on the contrast sensitivity of the higher pixel density display device at a corresponding spatial frequency. Another factor that may impact the first weighting is a viewing distance between the user and the higher pixel density display device of the computing device. In another example, an HDTV may include a 1080 PPx display device. A second weighting may be applied to a mean opinion score for streaming media content viewed on the HDTV. The second weighting may be based on the contrast sensitivity of the HDTV display device at a corresponding spatial frequency and on a viewing distance between the user and the HDTV display device. The second weighting may be higher than the first weighting even though the resolution of each display device is 1080 PPx because the spatial frequency for the higher pixel density display device is higher than a spatial frequency of the HDTV display device and the sensitivity of the higher pixel density display device is lower as compared to a sensitivity of the HDTV display device.

A structural similarity (SSIM) index may provide an approximation of image quality as perceived by a user based on the assumption that the human visual system (e.g., the human eye) may be adapted for extracting structural information from a viewed image. Structural similarity for an image may be used for measuring a similarity between a reference image for the image (e.g., typically an image that is uncompressed and free of artifacts and/or distortion) and the image as displayed on a display device and viewed by a user.

A multi-scale structural similarity (MS-SSIM) index for an image may be determined over multiple scales by, for example, sub-sampling (down sampling) the image based on an original resolution of the image. A MS-SSIM index may be computed by computing a SSIM for each of multiple different image resolutions. A weighted MS-SIMM index may weigh the MS-SSIM index based on a spatial frequency sensitivity of the display device that the image is being viewed on.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 is a diagram 100 showing media content 102 displayed on a display device 104 of a mobile computing device 106. For example, the mobile computing device 106 may be a smartphone, personal digital assistant (PDA), tablet, or other type of mobile computing device. Media content may be viewed (displayed) in a portrait orientation or mode of operation (as shown in FIG. 1) or a landscape orientation or mode of operation.

A user (e.g., user 108) may view the media content 102 on a screen of a display device 104 included in the mobile computing device 106. The user 108 may view the media content 102 at a viewing distance 112 as measured from the eyes of the user 108 to the screen of the display device 104. The media content 102 may be viewed at a viewing angle 110. In some implementations, the viewing distance 112 may play a role in a user perceived image quality of the media content 102 as viewed by the user 108 on the screen of the display device 104.

In some implementations, one or more characteristics of the display device 104 in combination with (in addition to) the viewing distance 112 may also impact the user perceived quality of the media content 102. The one or more characteristics of a display device (e.g., the display device 104) may include, but are not limited to, a quality of the display device (e.g., a pixel density, a pixel resolution), and a size of the display device (e.g., as measured by a display device diameter 114).

The media content 102 delivered to the mobile computing device 106 for display on the display device 104 may be of a certain encoding (encoded resolution). As described herein, the encoding may be expressed in pixels per "x" direction (PPx). The encoding of the media content delivered to a display device (e.g., the display device 104) may be of a number of pixels in the "x" direction that are equal to or slightly greater than (e.g., 1% greater, 5% greater, 10% greater) a number of pixels in the "x" direction of the screen of the display device (e.g., the display device 104). In some implementations, the resolution of the encoding provided to the mobile computing device 106 for display on the display device 104 may be selected to maximize a number of pixels of the display device 104 while taking into account a size of the encoding file for the encoding, a transmission speed between the computing system providing the encoding file and the mobile computing device 106, and a processing speed of the mobile computing device 106 when rendering the encoding file on the display device 104. For example, for a given screen size (e.g., pixel resolution, number of pixels in the "x" direction) of a display device (e.g., the display device 104), an encoding may be selected that is equal to or slightly larger than the screen size.

In some implementations, two display devices, a first display device and a second display device, may be of the same screen size (e.g., diagonals of each display device are equal), however, one of the display devices may be of a higher pixel density that the other. For example, a logical pixel on the first display device may be equal to a single physical pixel on the display device while a logical pixel on the second display device may be equal to more than one (e.g., four) physical pixels on the display device. For example, the second display device may be referred to as having a high pixel density (a pixel density higher than the first display device). The encoding may include image information and data for each logical pixel. However, the same encoding displayed on the second display device may be perceived by a user as having a higher perceived image quality based on the use of multiple physical pixels to represent each logical pixel in an encoding. In some implementations, however, this improved perceived image quality may be a factor of the viewing distance of the user to the display device. For example, if the viewing distance is too close to the display device, the user may see the individual physical pixels, which in some cases, may make an image appear as pixelated.

Referring to FIG. 1, the viewing distance 112 is greater than a size of the display device 104 (as represented by the display device diameter 114 (which may also be referred to as a diagonal 114)). For example, in implementations where the display device 104 may be considered a high pixel density display device (e.g., multiple physical pixels may be used to represent each logical pixel in an encoding), it may be assumed that a viewing distance of a user to the display device 104 that is greater than a size of the display device 104 (e.g., a viewing distance 112 that is greater than the display device diameter 114 of the display device 104) may result in a perceived image quality of the media content 102 that is better than (improved over, greater than) a perceived image quality of the media content 102 as displayed on a display device that represents each logical pixel as a physical pixel.

Figure 2:
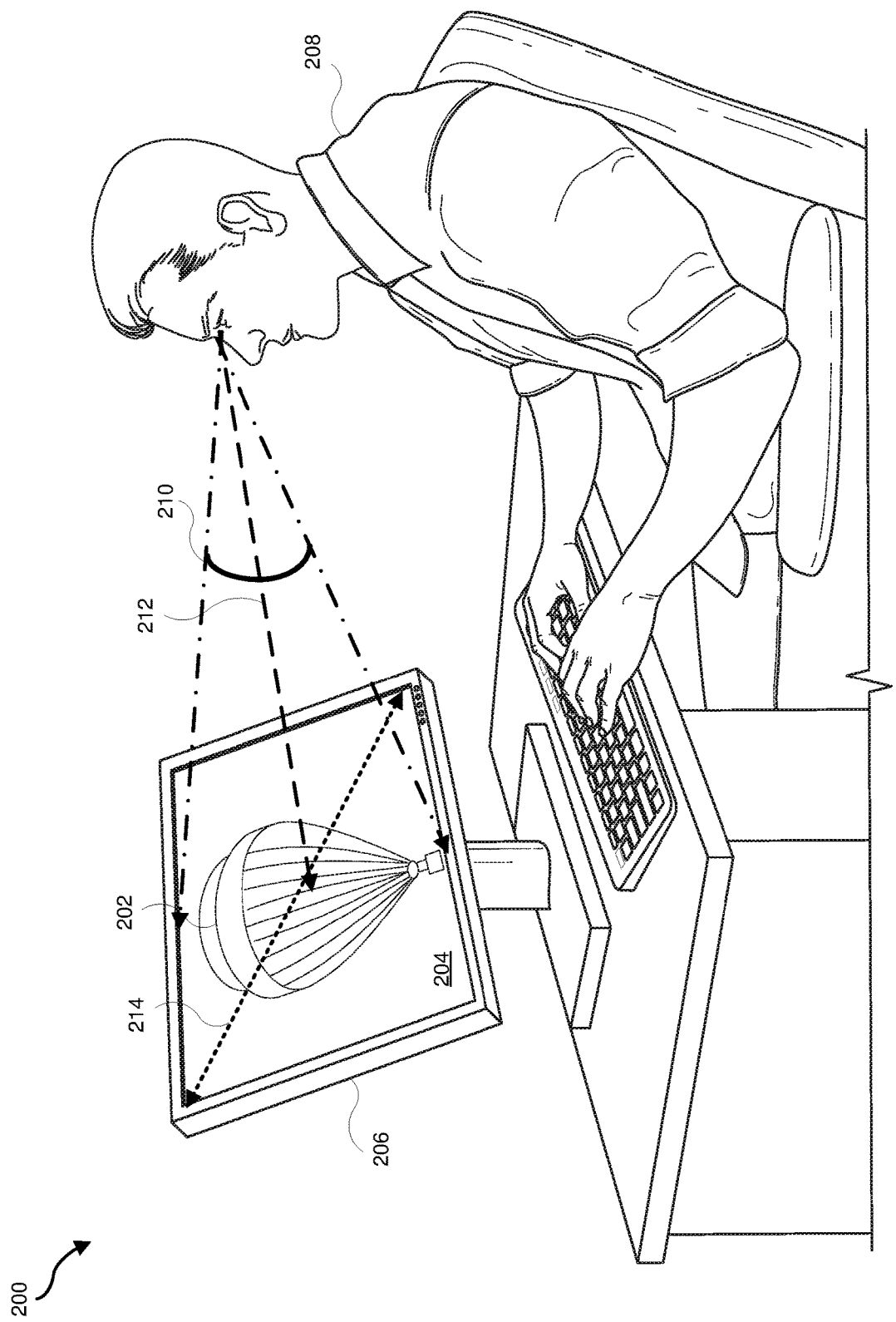
FIG. 2 is a diagram showing media content displayed on a monitor of a desktop computing device.

FIG. 2 is a diagram 200 showing media content 202 displayed on a display device (e.g., monitor 204) of a desktop computing device 206. In some implementations, the desktop computing device 206 may be a laptop computing device, a notebook computing device, or other type of computing device that may include a monitor and a keyboard or other type of input device.

A user (e.g., user 208) may view the media content 202 on a screen of the monitor 204. The user 208 may view the media content 202 at a viewing distance 212 as measured from the eyes of the user 208 to the screen of the monitor 204. The media content 202 may be viewed at a viewing angle 210. In some implementations, the viewing distance 212 may play a role in a user perceived image quality of the media content 202 as viewed by the user 208 on the screen of the monitor 204.

In some implementations, one or more characteristics of the monitor 204 in combination with (in addition to) the viewing distance 212 may also impact the user perceived quality of the media content 202. The one or more characteristics of the monitor 204 may include, but are not limited to, a quality of the monitor (e.g., a pixel density, a pixel resolution), and a size of the display device (e.g., as measured by a display device diameter 214).

The media content 202 delivered to the desktop computing device 206 for display on the monitor 204 may be of a certain encoding (encoded resolution). As described herein, the encoding may be expressed in pixels per "x" direction (PPx). The encoding of the media content delivered to the monitor 204) may be of a number of pixels in the "x" direction that are equal to or slightly greater than (e.g., 1% greater, 5% greater, 10% greater) a number of pixels in the "x" direction of the screen of the monitor 204. For example, for a given screen size (e.g., pixel resolution, number of pixels in the "x" direction) of a monitor (e.g., the monitor 204), an encoding may be selected that is equal to or slightly larger than the screen size.

In some implementations, two monitors, a first monitor and a second monitor, may be of the same screen size (e.g., diagonals of each monitor are equal), however, one of the monitors may be of a higher pixel density that the other. As described with reference to FIG. 1, the same encoding displayed on each monitor may be perceived by a user as having a higher perceived image quality on the second monitor based on the use of multiple physical pixels to represent each logical pixel in an encoding. In some implementations, however, this improved perceived image quality may be a factor of the viewing distance of the user to the monitor. For example, if the viewing distance is too close to the monitor, the user may see the individual physical pixels, which in some cases, may make an image appear as pixelated.

Referring to FIG. 2, the viewing distance 212 may be approximately equal to or greater than a size of the monitor 204 (as represented by the display device diameter 214 (which also may be referred to as diagonal 214)). For example, in implementations where the monitor 204 may be considered a high pixel density monitor (e.g., multiple physical pixels may be used to represent each logical pixel in an encoding), it may be assumed that the viewing distance 212 may result in a perceived image quality of the media content 202 that is better than (improved over, greater than) a perceived image quality of the media content 202 as displayed on a monitor that represents each logical pixel as a physical pixel.

Figure 3:
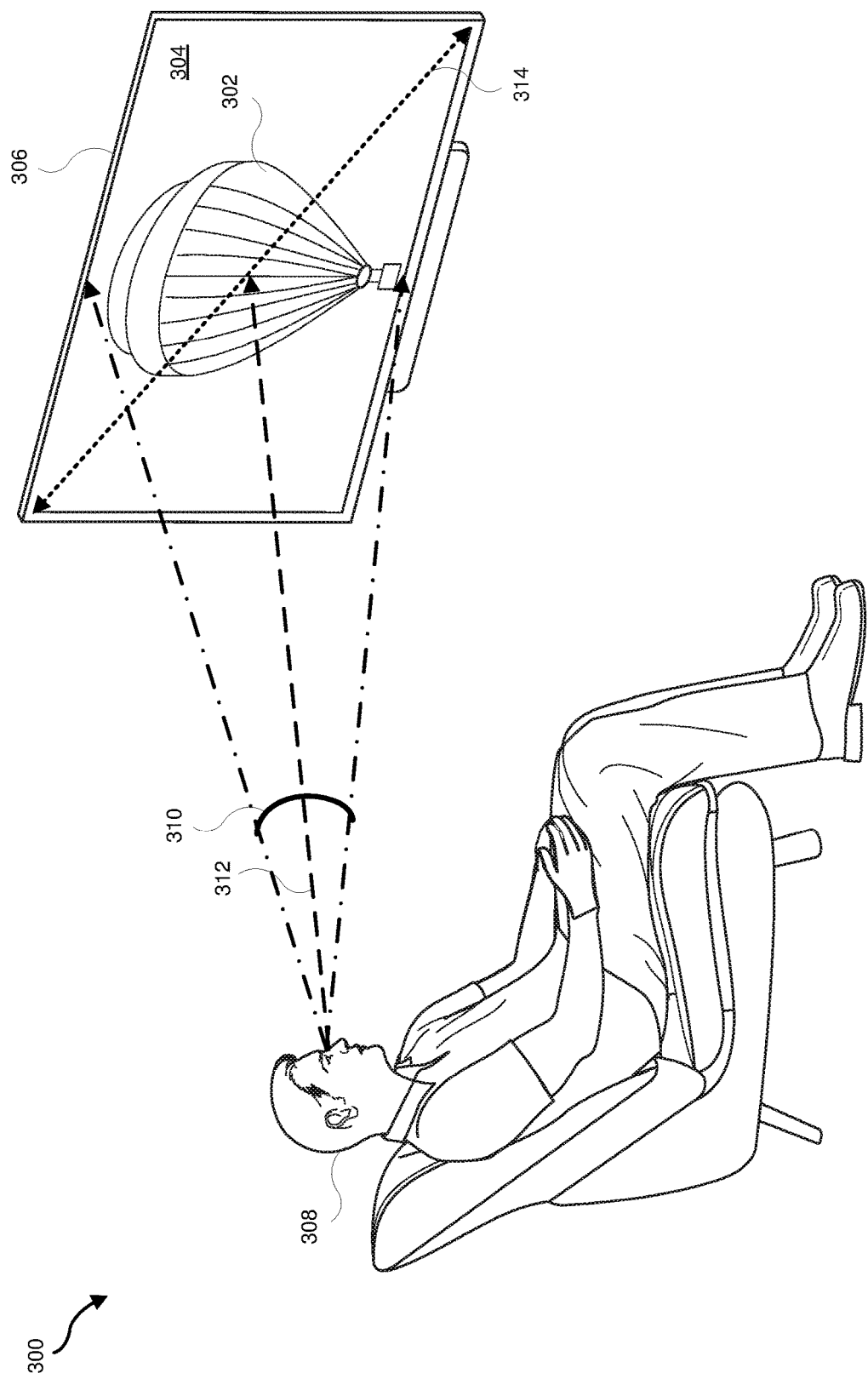
FIG. 3 is a diagram showing media content displayed on a high-definition television (HDTV).

FIG. 3 is a diagram 300 showing media content 302 displayed on a high-definition television (HDTV) 306. A user (e.g., user 308) may view the media content 302 on a screen 304 of the HDTV 306. The user 308 may view the media content 302 at a viewing distance 312 as measured from the eyes of the user 308 to the screen 304. The media content 302 may be viewed at a viewing angle 310. In some implementations, the viewing distance 312 may play a role in a user perceived image quality of the media content 302 as viewed by the user 308 on the screen 304.

In some implementations, one or more characteristics of the HDTV 306 in combination with (in addition to) the viewing distance 312 may also impact the user perceived quality of the media content 302. The one or more characteristics of the HDTV 306 may include, but are not limited to, a quality of the HDTV (e.g., a pixel density, a pixel resolution), and a size of the HDTV (e.g., as measured by display device diameter 314).

The media content 302 delivered to the HDTV 306 for display on the screen 304 may be of a certain encoding (encoded resolution). As described herein, the encoding may be expressed in pixels per "x" direction (PPx). The encoding of the media content delivered to the HDTV 306 may be of a number of pixels in the "x" direction that are equal to or slightly greater than (e.g., 1% greater, 5% greater, 10% greater) a number of pixels in the "x" direction of the screen 304. For example, for a given size of the screen 304 (e.g., pixel resolution, number of pixels in the "x" direction), an encoding may be selected that is equal to or slightly larger than the size of the screen 304.

Referring to FIG. 3, the viewing distance 112 may impact a perceived image quality. For example, if the user 308 were to sit very close to the screen 304 (e.g., a viewing distance much less than the display device diameter 314 (e.g., a viewing distance equal to half the display device diameter 314 (which may also be referred to as diagonal 314)), the user 308 may see each physical pixel on the screen 304. Viewing the media content 302 at the viewing distance 312, however, may result in a visual smoothing or blending of pixels as viewed by the user 308, resulting in a better (higher) perceived image quality than at the much closer viewing distance.

Figure 4:
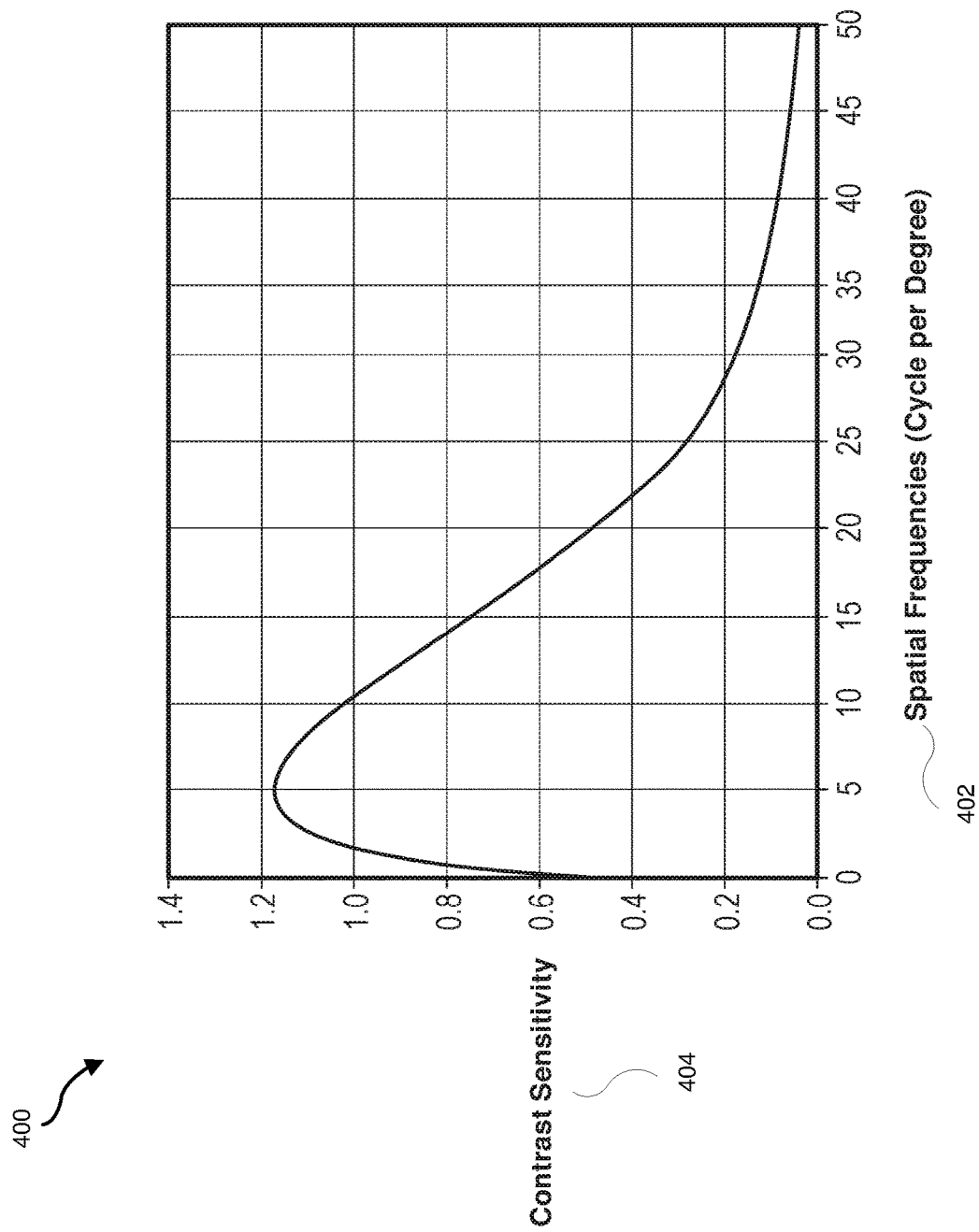
FIG. 4 is a diagram showing an example first graph of spatial frequency verses contrast sensitivity for an example visual system for viewing media content.

FIG. 4 is a diagram showing an example first graph 400 of spatial frequency 402 (in cycles per degree) verses contrast sensitivity 404 for an example visual system for viewing media content.

Figure 5:
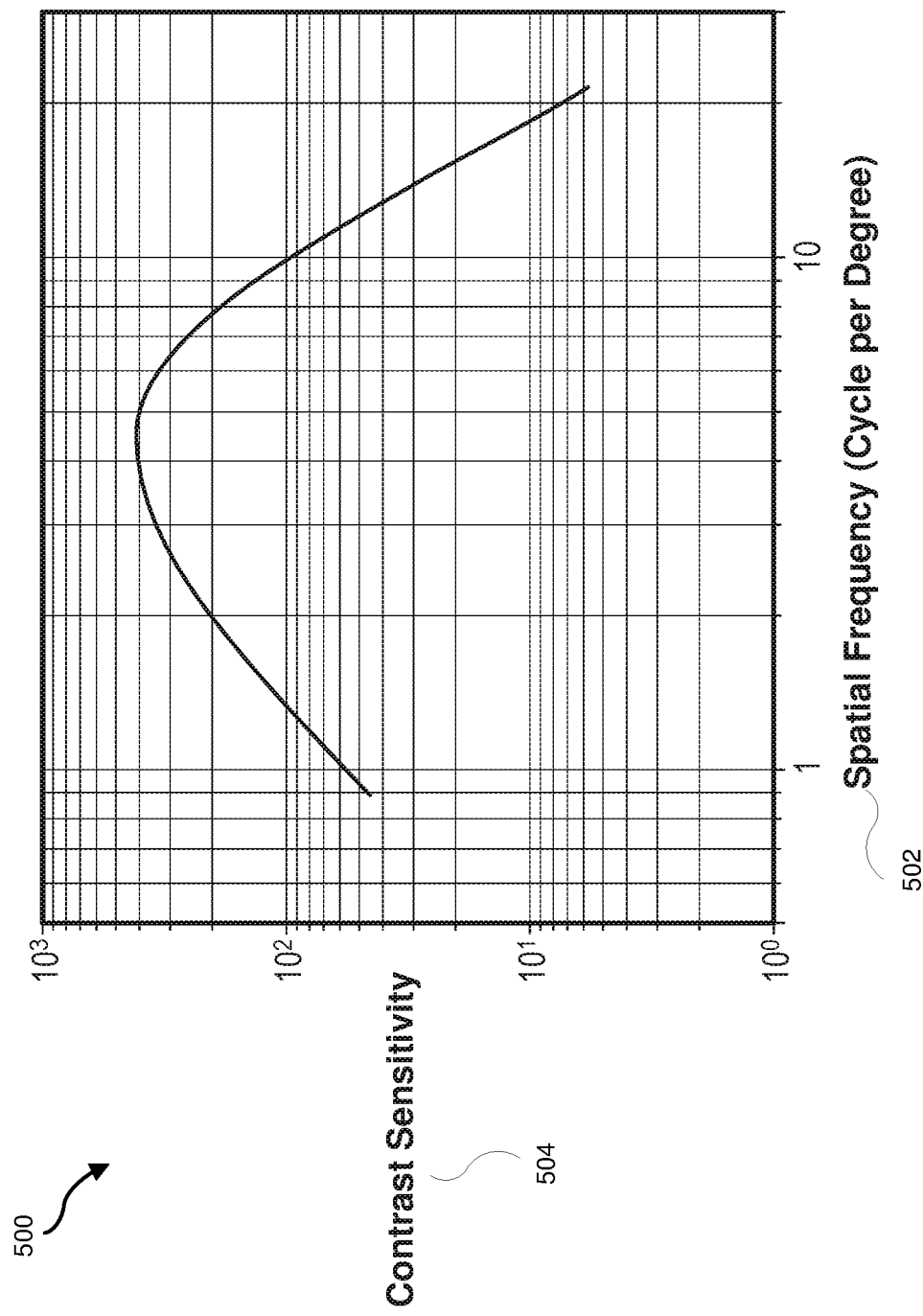
FIG. 5 is a diagram showing an example second graph of spatial frequency verses contrast sensitivity for an example visual system for viewing media content.

FIG. 5 is a diagram showing an example second graph 500 of spatial frequency 502 (in cycles per degree) verses contrast sensitivity 504 for an example visual system for viewing media content.

A sensitivity of a visual system may be dependent on a spatial frequency of a signal. Human visual sensitivity may peak at frequencies around four cycles per degree of visual angle and may decrease along high and low frequency directions. Spatial frequency may be dependent on a number of pixels, a pixel density (pixel per inch (ppi), pixels per "x" direction (ppx)) and viewing distance of a user from a display device.

In some implementations, a mean opinion score may guide the customizing of media content based on a viewing distance of the user to the display device displaying (playing) the media content. For example, as described, display devices may have different pixel densities (pixels per centimeter, pixels per inch) that may be independent of a size of the display device. In some implementations, a perceived image quality may be dependent on pixel resolution, pixel density and a viewing distance of a user from the display device. For example, a user viewing 1080p encoded media content on a low ppi computing device may have a different experience as compared to viewing the 1080p encoded media content on a high ppi computing device.

In some implementations, it may be beneficial to have a mean opinion score configurable based on a multi-scale weighting to accommodate for display device number of pixels, pixel density (ppi), and viewing distance of a user from a display device. For example, a resolution of received media content may vary. In addition, or in the alternative, as shown with reference to FIGS. 1-3, the media content may be viewed on display devices of varying pixel densities, varying sizes, and may be viewed at different viewing distances. All of these factors may contribute to the viewing experience of the user.

Figure 6:
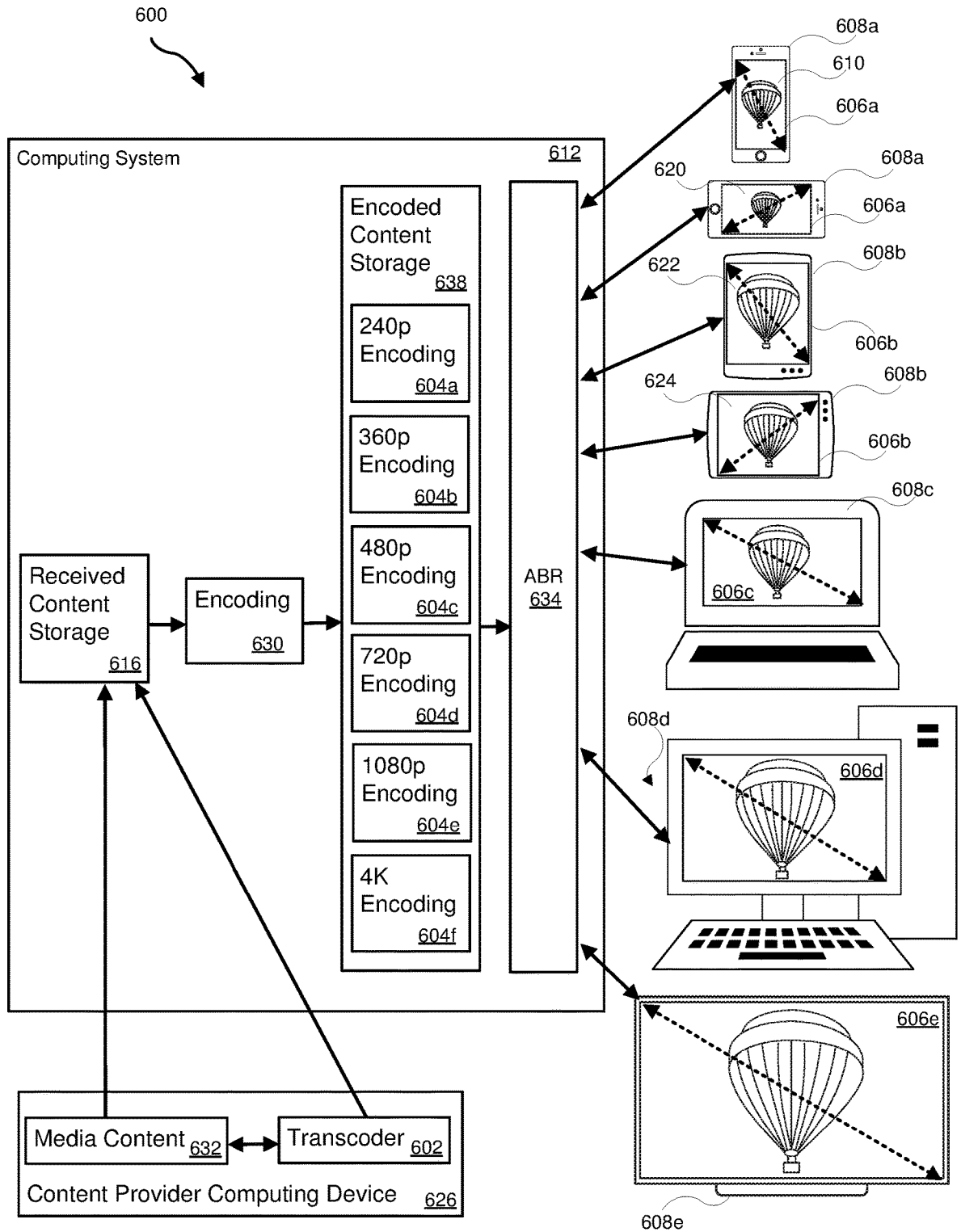
FIG. 6 is a block diagram of an example system for providing media content from a content provider computing device to a computing system that may further provide an encoded version of the media content to one or more playback display devices included in respective playback computing devices.

FIG. 6 is a block diagram of an example system 600 for providing media content 632 from a content provider computing device 626 to a computing system 612 that may further provide an encoded version of the media content to one or more playback display devices (e.g., display devices 606a-e) included in respective playback computing devices (e.g., computing devices 608a-e).

The media content 632 may be stored in a received content storage repository 616. In some implementations, the media content 632 may be an encoded or transcoded version of original media content as captured, obtained, generated, and/or created by the content provider computing device 626. A transcoder 602 may perform the encoding and/or transcoding on the original media content to compress the data in the original media content for improved transmission from the content provider computing device 636 to the computing system 612. In some implementations, the received media content may be the original media content.

As described herein, resolution of media content may be represented as video resolution where "p" stands for progressive scanned (i.e., non-interlaced). For example, a number before the "p" may represent a number of vertical pixels in the media content. A number of horizontal pixels may be determined to provide media content at particular aspect ratios (e.g., 3:2, 4:3, 16:9, 5:3, 15:10, 18:10, etc.). Though examples are provided herein, the concepts described may be applied to media content at all resolutions.

For example, 240p may have a resolution of 320 pixels horizontally by 240 pixels vertically to provide media content at a 4:3 aspect ratio. For example, 240p may have a resolution of 428 pixels horizontally by 240 pixels vertically to provide media content at a 16:9 aspect ratio. For example, 360p may have a resolution of 480 pixels horizontally by 360 pixels vertically to provide media content at a 4:3 aspect ratio.

For example, 480p may have a resolution of 640 pixels horizontally by 480 pixels vertically to provide media content at a 4:3 aspect ratio. For example, 480p may have a resolution of 854 pixels horizontally by 480 pixels vertically to provide media content at a 16:9 aspect ratio. For example, 480p may have a resolution of 720 pixels horizontally by 480 pixels vertically to provide media content at a 3:2 aspect ratio.

For example, 720p may have a resolution of 1280 pixels horizontally by 720 pixels vertically to provide media content at a 16:9 aspect ratio. For example, 1080p may have a resolution of 1920 pixels horizontally by 1080 pixels vertically to provide media content at a 16:9 aspect ratio. For example, 4K may have a resolution of 3840 pixels horizontally by 2160 pixels vertically to provide media content at a 16:9 aspect ratio.

An encoding module 630 may encode received content stored in the received content storage repository 616 into one or more progressive scanned encodings (encodings 604a-f) for storage in the encoded content storage 638. An adaptive bitrate module 634 may interface with one or more of the playback computing devices 608a-e to determine which progressive scanned encoding of the media content to provide to the respective playback display devices 606a-e based on one or more criteria that may include, but is not limited to, a display resolution of the respective playback display device 606a-e, an orientation of the respective playback display device 606a-e, a viewing mode of the media content, and a communication speed between the computing system 612 and the respective playback computing device 608a-e.

For example, the computing device 608a may be a smartphone, personal digital assistant (PDA), or other type of mobile computing device. Media content may be viewed (displayed) in a portrait orientation or mode of operation (e.g., portrait mode 610) or a landscape orientation or mode of operation (e.g., landscape mode 620). For example, the computing device 608b may be a tablet computing device. Media content may be viewed (displayed) in a portrait orientation or mode of operation (e.g., portrait mode 622) or a landscape orientation or mode of operation (e.g., landscape mode 624). For example, the computing device 608c may be a laptop computing device. For example, the computing device 608d may be a desktop computing device. For example, the computing device 608e may be an HDTV.

As shown in FIG. 6, the same media content (e.g., a picture (image, video) of a hot air balloon) may be displayed on each playback display device 606a-e. A quality of the received media content may influence a playback quality of the displayed encoded media content. For example, dependent on the size, pixel density, resolution, and orientation of the playback display device 606a-e, as well as a viewing distance of the user to the playback device (as shown, for example, in FIGS. 1-3), a playback quality of the displayed encoded media content may vary and, also taking into account a viewing distance of the user to the playback display device, a quality of the displayed encoded media content as perceived by the user may vary. For example, the same media content may be displayed on the display device 606a of the computing device 608a in a portrait mode 610 and a full screen landscape mode 620. In some implementations, the media content may be displayed on the display device 606a of the computing device 608a in an in-feed portrait mode. In some cases, a playback quality of the media content may be perceived as lower quality when displayed in the full screen landscape mode 620 as compared to the portrait mode 610 if the quality (resolution) of the encoded media content provided to the computing device 608a in each orientation was received at a resolution such that the portrait mode 610 provides a sharper image than the full screen landscape mode 620. For example, displaying encoded media content that was received at a resolution that is much lower (less than) a resolution of the display device 606e of the computing device 608e (e.g., a 4K HDTV) may result in a perceived low quality for the viewing of the media content on the display device 606e.

Figure 7:
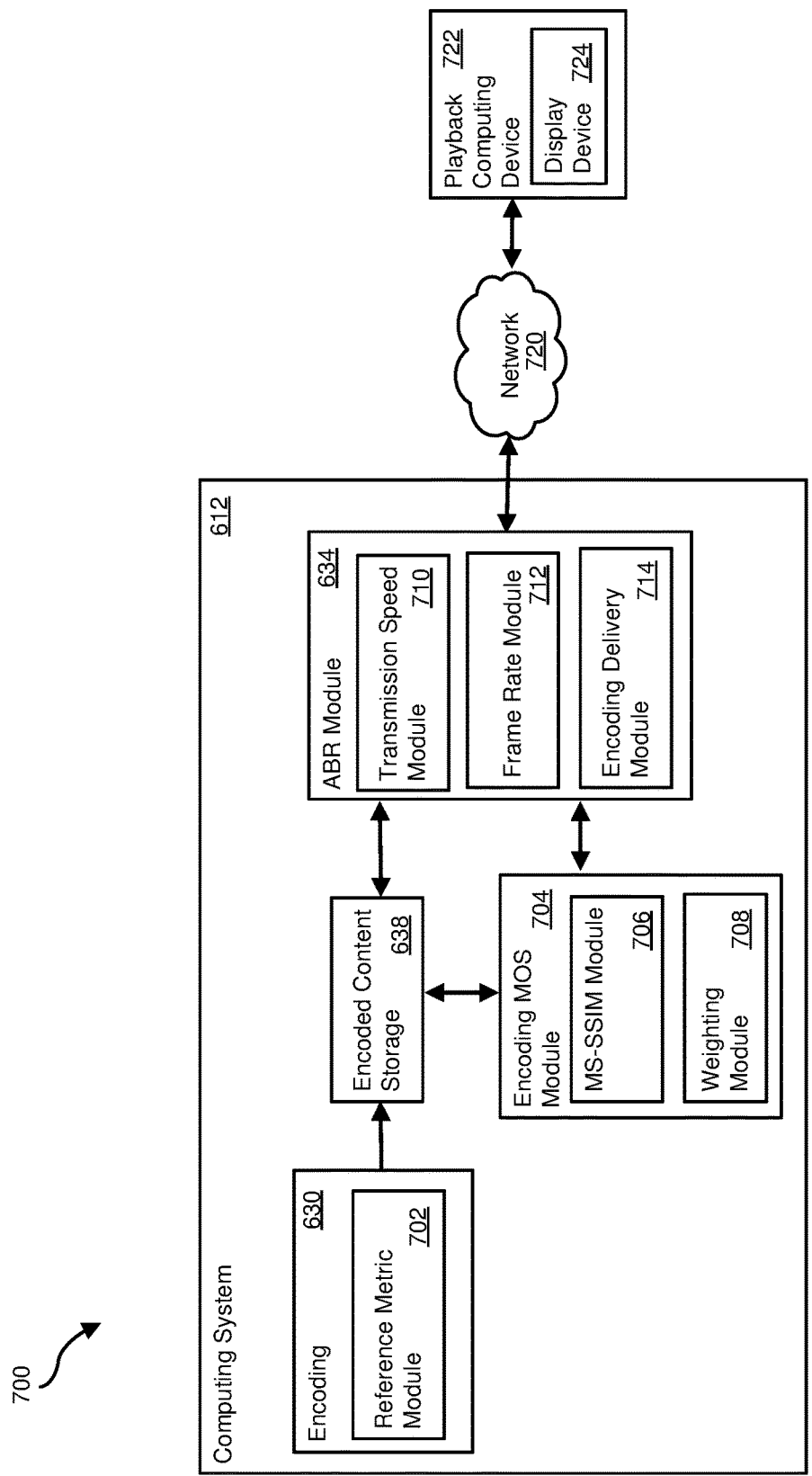
FIG. 7 is a block diagram of an example system for providing encoded content to a playback computing device.

FIG. 7 is a block diagram of an example system 700 for providing encoded content to a playback computing device (e.g., playback computing device 722). The playback computing device 722 may be one of the playback computing devices 608a-e. The playback computing device 722 may include a display device 724. The display device 724 may be one of the display devices 606a-e.

In some implementations, referring also to FIG. 6, a reference metric module 702 included in the encoding module 630 may compute a full reference metric at each encoding resolution (e.g., 240p encoding 604a, 360p encoding 604b, 480p encoding 604c, 720p encoding 604d, 1080p encoding 604e, and 4K encoding 604e). For example, a scaled structural similarity (SSIM) and/or a peak signal-to-noise ratio (PSNR) may be estimated for the media content at a fixed resolution and stored as the full reference metric with the associated encoded media content stored in the encoded content storage 638.

In some implementations, the reference metric module 702 may determine (compute) a multi-scale SSIM (MS-SSIM) index for an image (or a video) at an encoding at one or more down sampled scales. The MS-SIMM index may be considered a full reference metric that may be stored along with the encoding in the encoded content storage 638. The use of a MS-SSIM index for an image may allow for the incorporation of image details at different resolutions (e.g., the one or more down sampled scales) for the image. For example, the original image may be indexed as Scale_1 and an index of Scale_M is applied to the image after M rounds of down sampling of the image by a factor of two.

Expression 1 is an example of computing a MS-SSIM index for an image from a first scale for the original resolution of the image (Scale 1) to a last scale (Scale_M) which is a result of M rounds of down sampling the original image by a factor of two. Expression 1 uses a scale for each round of down sampling from the original image (e.g., i=1) to the Mth scale (the last scale) (e.g., i=M) to calculate the MS_SIMM index for the image.

$$MS\text{-}SSIM = \prod_{i=1}^{M} (SSIM_i^{\gamma_i}) \quad (1)$$

where M=number of rounds, and γ=weighting factor. For example, for five rounds of down sampling by a factor of two (five subsamples), a SSIM is determined (calculated) for each round and then weighted based on a weighting factor, $\gamma_1$, associated with the respective scale (i).

Expression 2 is an example of computing a weighting factor at each round of the down sampling (at each scale) (e.g., a weighting factor at each of i=1 to i=M.) The weighting factor may place an importance for each SIMM value for each round of the down sampling. Expression 2 is an example showing a normalization of the settings. Each setting is based on a common fixed viewing distance of a user to a display device and a fixed pixel density for each delivered image resolution (e.g., a fixed PPx per viewing distance).

$$\sum_{i=1}^{M} (\gamma_i) = 1 \quad (2)$$

Expression 3 is an example of computing a weighted MS-SSIM index for an image from a first scale for the original resolution of the image (Scale_1) to a last scale (Scale_M) which is a result of M rounds of down sampling the original image by a factor of two. A MS_SSIM module 706 included in an encoding mean opinion score module 704 may determine (compute) the weighted MS_SSIM index. The weighted MS_SSIM index may take into account a playback resolution, a display device pixel-width resolution (PPx), a pixel density, and an estimated viewing distance of the user to the display device when determining a weighting factor for each scale of the weighted MS-SIMM index.

For example, a weighting module 708 included in the encoding mean opinion score module 704 may determine (calculate) a weighting factor at each scale based on a contrast sensitivity at a corresponding spatial frequency (e.g., see FIGS. 4 and 5, for example) for a display device of a playback device. The spatial frequency may be a function of the display device pixel-width resolution (PPx) and an estimated viewing distance of the user to the display device (e.g., see FIGS. 1-3, for example). As described, a sensitivity of a visual system (e.g., a display device) may depend on a spatial frequency of a visual angle of a user to the display device. As shown in FIGS. 4 and 5, for example, human visual sensitivity (e.g., the contrast sensitivity 404, the contrast sensitivity 504) may peak at middle frequencies (e.g., at approximately four cycles per degree of visual angle) and may decrease in both a higher frequency direction and lower frequency direction. A spatial frequency may depend on a number of pixels per inch (PPi) (e.g., a display device pixel-width resolution (PPx)) and a viewing distance of a user to the display device.

$$\text{Weighted MS-SSIM} = \text{SSIM}^{(\gamma_i \times \delta_i)} \quad (3)$$

where M=number of rounds, γ=first weighting factor (as shown in Expression 2), and δ=second weighting factor (as shown in Expression 4). For example, for five rounds of down sampling (M=five) by a factor of two (five subsamples), a SSIM is determined (calculated) for each round and then weighted based on a first weighting factor and a second weighting factor associated with scale.

$$\text{For } i=1 \text{ to } i=M, \delta^i = CS_{sf} \quad (4)$$

where $CS_{sf}$ is a contrast sensitivity value (CS) at a corresponding spatial frequency (sf). For example, see FIGS. 4 and 5.

At the time of delivery of the encoded media content to a computing device (e.g., one or more of the computing devices 608a-e) for display on a display device of the computing device (e.g., one or more of the display devices 606a-e, respectively), the adaptive bitrate module 634 may determine a playback resolution, a display device pixel-width resolution (PPx), a pixel density, and established (e.g., estimated) viewing distance for the display device of the computing device. Because spatial frequency may be a function of a display device pixel density and a viewing distance of a user to the display device, a weighting (e.g., the second weighting factor δ) may be determined for each encoding resolution and for each subsample of the encoding resolution based on a contrast sensitivity at a corresponding spatial frequency. For example, referring to the graphs of FIGS. 4 and 5, a second weighting factor may be determined at each subsample For example, a low weighting may be applied to a 1080p encoding provided to a high pixel density display device of a first size because the high pixel density display device may be considered to have a high spatial frequency for relatively low contrast sensitivity. In another example, a weighting higher than the weighting applied to the 1080p encoding provided to the high pixel density display device may be applied to the 1080p encoding when provided to an HDTV. As such, a mean opinion score for a 1080p encoded image may differ dependent on the display device the image is viewed on. The use of a weighted MS-SIMM index as described herein may account for the display device differences (e.g., pixel density, display device pixel resolution) while also taking into account a typical viewing distance of the user to the display device.

Referring to FIGS. 1, 2, 3, and 6, in some implementations, an encoding delivery module 714 included in the adaptive bitrate module 634 may provide the same encoding to multiple different computing devices. Based on the characteristics of the computing device and the viewing distance of the user to the screen of the computing device, the same encoding may have a different perceived image quality. For example, the transmission speed module 710 may determine a transmission rate between the computing system 612 and the playback computing device 722 by way of the network 720. The adaptive bitrate module 634 may use the determined transmission rate along with one or more characteristics of the playback computing device (e.g., a processor speed and/or computing capability) and one or more characteristics of the display device (e.g., pixel resolution, pixel density) to determine an encoding to send to the playback computing device 722. In some implementations, the adaptive bitrate module 634 may provide the same encoding (e.g., the 1080p encoding 604e to each of the computing devices 608a-e. As described herein, the one or more characteristics of the playback computing device, the one or more characteristics of the display device of the computing device, and/or the viewing distance of a user to the display device of the computing device may result in different perceived image quality for the same encoding.

A frame rate module 712 included in the adaptive bitrate module 634 may determine a preferred (optimum) frame rate for delivery of streaming media to a playback computing device. In some implementations, a frame rate for an encoding may influence a perceived image quality for the encoding. For example, media content displayed at a high frame rate may be desired for interactive streaming media content (e.g., video games). In some cases, however, if one or more characteristics of a computing device and/or one or more characteristics of a display device included in the computing device are not capable of providing and displaying, respectively, the streaming media content at the desired frame rate, the perceived image quality of the streaming media content may be reduced as compared to a computing device that is capable of providing the streaming media content at the desired frame rate. In some implementations, however, in cases where one or more characteristics of a computing device and/or one or more characteristics of the display device included in the computing device may not be capable of providing and displaying, respectively, streaming media content at a first frame rate, dependent on the content of the streaming media content, a computing system may provide the streaming media content to the playback computing device at a second frame rate, less than the first frame rate, but sufficient to properly display the streaming media content resulting in favorable perceived image quality for the streaming media.

Figure 8:
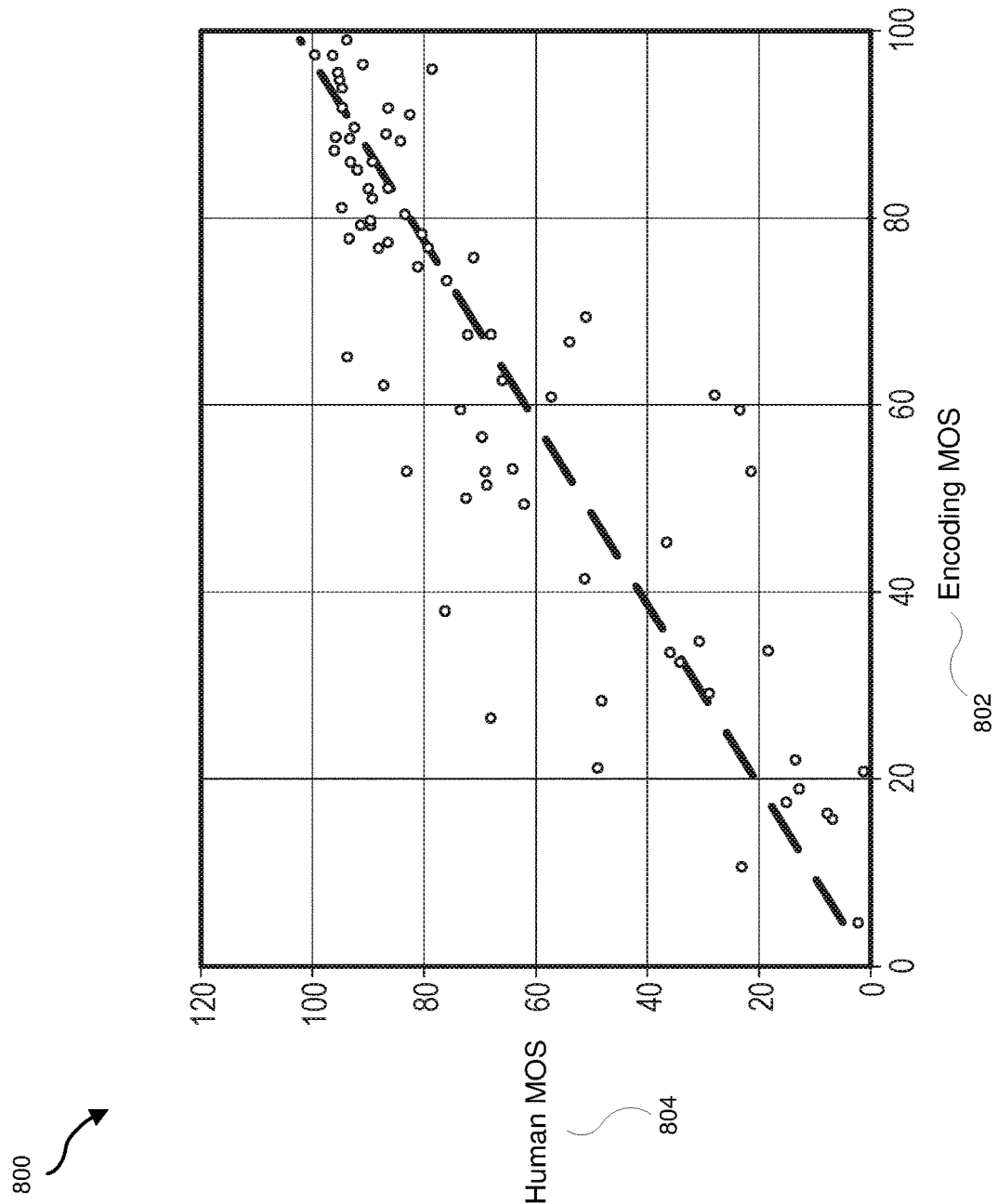
FIG. 8 is a diagram showing an example graph of predicted mean opinion scores based on an encoding mean opinion score verses a mean opinion score based on information provided by a user.

FIG. 8 is a diagram showing an example graph 800 of predicted mean opinion scores based on an encoding mean opinion score (encoding MOS 802) verses a mean opinion score based on information provided by a user (viewer) (Human MOS 804). The example graph 800 shows that a predicted encoding mean opinion score as compared to a mean opinion score based on information provided by a user is reasonable and effective. For example, a Spearman ranking may be equal to 0.873 and a Pearson linearity may be equal to 0.872.

Figure 9:
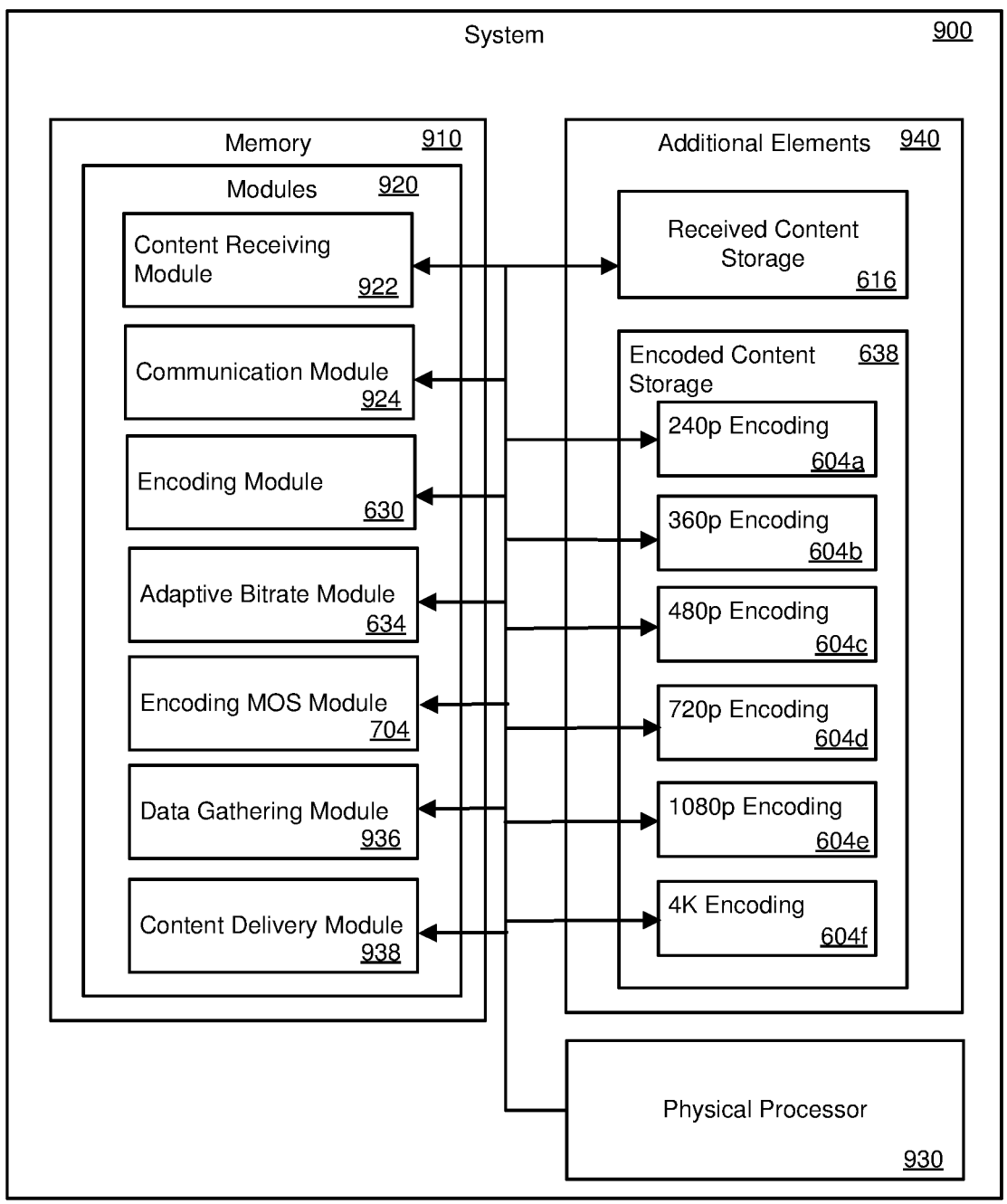
FIG. 9 is a block diagram of an example system 900 that includes modules for use in measuring image quality based on an image quality metric.

FIG. 9 is a block diagram of an example system 900 that includes modules for use in measuring image quality based on an image quality metric. Referring to FIGS. 6 and 7, modules 920 may include the encoding module 630, the adaptive bitrate module 634, and the encoding mean opinion score module 704. The modules 920 may include a content receiving module 922, a communication module 924, a data gathering module 936, and a content delivery module 938.

Although illustrated as separate elements, one or more of modules 920 in FIG. 9 may represent portions of a single module or application.

Referring to FIG. 6 and FIG. 7, the content receiving module 922 may receive media content 632 (which may be compressed or transcoded) from the content provider computing device 626. The content receiving module 922 may store the received media content 632 in the received content storage repository 616. The communication module 924 may facilitate communications between the system 900 and a content provider computing device (e.g., the content provider computing device 626). The communication module 924 may determine and/or provide a bandwidth of a communication connection between the system 900 and a computing device to the adaptive bitrate module 634 for use in determining an encoding and transmission bitrate for delivery of the encoded media content to the computing device. The communication module 924 may determine and/or provide a bandwidth of a communication connection between the system 900 and a computing device to the content delivery module 938. The content delivery module 938 may provide (transmit) the selected encoding of the media content to the computing device. The encoding mean opinion score module 704 may determine (calculate) an encoding mean opinion score that is based on a MS_SIMM index and a weighting as determined (calculated) by the MS-SSIM module 706 and the weighting module 708, respectively.

The data gathering module 936 may gather information and data for use in determining (calculating) weightings, reference metrics, MS-SIMM indexes, and encoding mean opinion scores. For example, information and data associated with a perceived quality of viewed media content associated with delivered resolutions (encodings), delivered transmission speeds, and delivered frame rates may be used to determine (calculate) an encoding mean opinion score. For example, a computing system may deliver a video to a computing device of a user at a particular resolution (encoding), transmission speed, and frame rate. The user may provide a score for a perceived quality of the delivered video which may later be used by the encoding mean opinion score module 704 to determine (generate) an encoding mean opinion score for the video delivered to the computing device at the particular video resolution, transmission speed, and frame rate. The generated encoded mean opinion score may be stored in a table for use in predicting encoding mean opinion scores for subsequent media content for delivery to the computing device as disclosed herein.

In certain embodiments, one or more of modules 920 in FIG. 9 may represent one or more software applications or programs that, when executed by a computing system, may cause the computing system to perform one or more tasks. As illustrated in FIG. 9, example system 900 may also include one or more memory devices, such as memory 910. Memory 910 generally represents any type or form of volatile or non-volatile storage device or medium capable of storing data and/or computer-readable instructions. In one example, memory 910 may store, load, and/or maintain one or more of modules 920. Examples of memory 910 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 9, example system 900 may also include one or more physical processors, such as physical processor 930. Physical processor 930 generally represents any type or form of hardware-implemented processing unit capable of interpreting and/or executing computer-readable instructions. In one example, physical processor 930 may access and/or modify one or more of modules 920 stored in memory 910. Additionally, or alternatively, physical processor 930 may execute one or more of modules 920. Examples of physical processor DD30 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 9, example system 900 may also include one or more additional elements 940. The additional elements 940 generally represent any type or form of hardware and/or software. In one example, physical processor 930 may access and/or modify one or more of the additional elements 940.

The additional elements 940 may be included in one or more repositories. The one or more repositories may be a memory (e.g., the memory 910). The one or more repositories may be databases. In some implementations, the additional elements 940 may be included (part of) the system 900. In some implementations, the additional elements 940 may be external to the system 900 and accessible by the system 900. Referring to FIG. 6 and FIG. 7, the additional elements 940 may include the received content storage repository 616 and the encoded content storage 638. The encoded content storage 638 may store encodings 604a-f.

Figure 10:
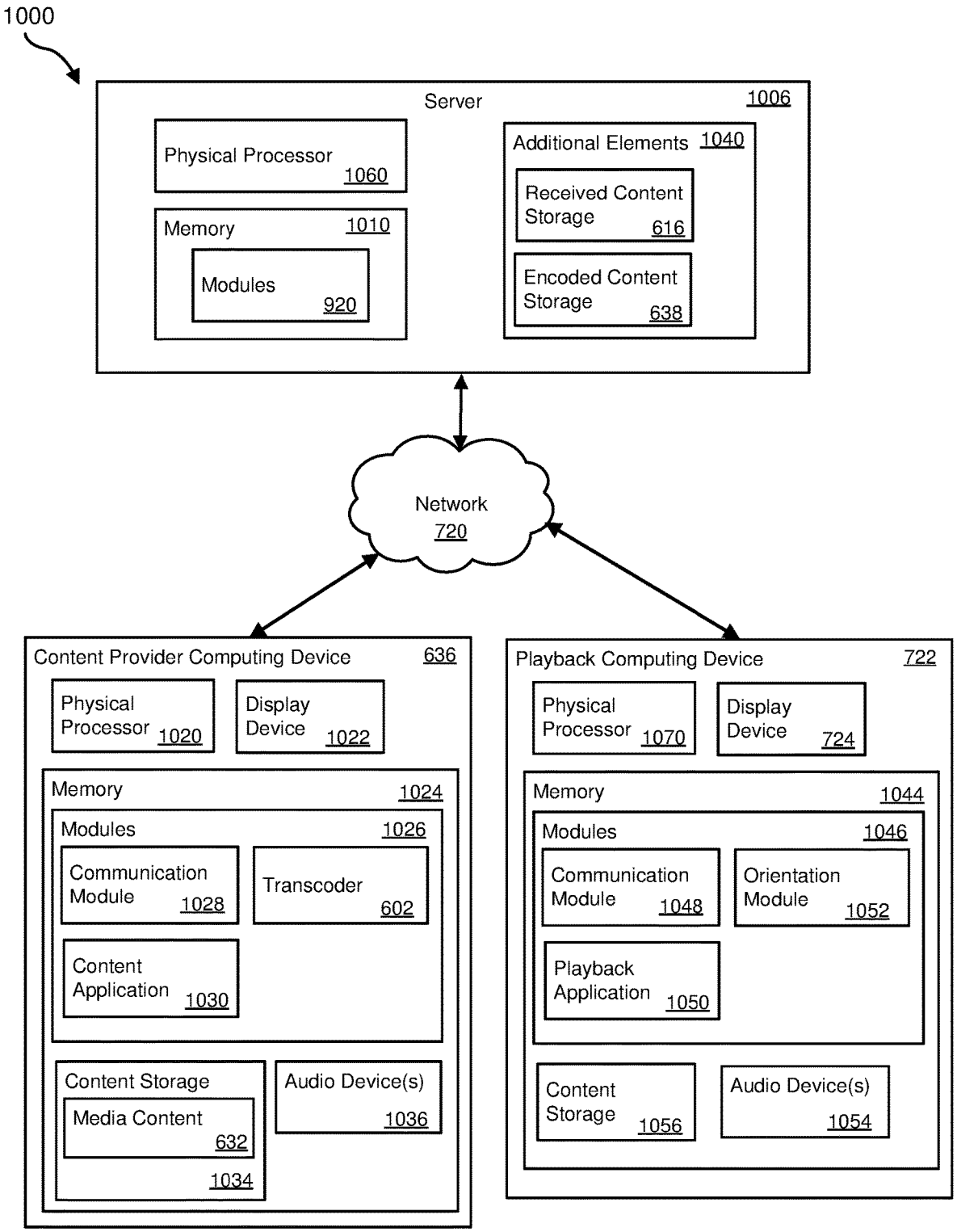
FIG. 10 illustrates an exemplary network environment in which aspects of the present disclosure may be implemented.

FIG. 10 illustrates an exemplary network environment 1000 in which aspects of the present disclosure may be implemented. The network environment 1000 may include one or more computing devices (e.g., the content provider computing device 636, the playback computing device 722), the network 720, and a server 1006. The playback computing device 722 may represent any one of the playback computing devices 608a-e. The playback computing device 722 may represent any one of the mobile computing device 106, the desktop computing device 206, and the HDTV 306.

In one example, the server 1006 may host a system for receiving media content, determining (calculating) weighted metrics and encoding mean opinion scores for the media content, and delivering an encoding of the media content to a playback computing device. For example, the server 1006 may host all or part of the system 900 as shown in FIG. 9. In this example, the server 1006 may include a physical processor 1060 that may be one or more general-purpose processors that execute software instructions. The server 1006 may include a data storage subsystem that includes a memory 1010 which may store software instructions, along with data (e.g., input and/or output data) processed by execution of those instructions. Referring to FIG. 9, the memory 1010 may include the modules 920.

The server 1006 may include additional elements 1040. Referring FIG. 9, the additional elements 1040 may include all or part of the additional elements 940. In some implementations, all or part of the additional elements 1040 may be external to the server 1006 and the playback computing device 722 and may be accessible by the server 1006 either directly (a direct connection) or by way of the network 720.

The content provider computing device 636 may represent a client device or a user device, such a desktop computer, laptop computer, tablet device, smartphone, or other computing device, examples of which are included herein. The content provider computing device 636 may include a physical processor (e.g., physical processor 1020), which may represent a single processor or multiple processors, and one or more memory devices (e.g., memory 1024), which may store instructions (e.g., software applications) and/or data in one or more modules 1026. The modules 1026 may store software instructions, along with data (e.g., input and/or output data) processed by execution of those instructions.

The content provider computing device 636 may be (represent) a computing device of a user. The content provider computing device 636 may include storage for the media content 632 (e.g., content storage 1034) obtained, created, and/or generated by the user. In some implementations, media content stored in the media content 632 may be accessed by a content application 1030. The content application 1030 may include hardware and/or software for displaying the media content on a display device 1022 included in the content provider computing device 636. In addition, or in the alternative, the content application 1030 may include hardware and/or software for providing media content to the server 1006 by way of the network 720. A communication module 1028 may include hardware and/or software for establishing a connection to the server 1006 by way of the network 720, for example, by interfacing with the communication module 924 included in the modules 920. In some implementations, the content application 1030 may include hardware and/or software for providing media content to a transcoder 602. The transcoder 602 may include hardware and/or software for transcoding and/or compressing the media content for subsequent delivery to the server 1006. In some implementations, the transcoded and/or compressed media content may be stored in the media content 632 for later delivery to the server 1006. One or more audio device(s) 1036 may include hardware and/or software for playing audio media content (e.g., one or more speakers) and/or for recording audio media content (e.g., one or more microphones).

The content provider computing device 636 may be communicatively coupled to the server 1006 through the network 720. The network 720 may be any communication network, such as the Internet, a Wide Area Network (WAN), or a Local Area Network (LAN), and may include various types of communication protocols and physical connections.

The playback computing device 722 may represent a client device or a user device, such a desktop computer, laptop computer, tablet device, smartphone, or other computing device as disclosed herein. In addition, or in the alternative, the playback computing device 722 may represent a smart TV, an HDTV, a digital display device, an electronic visual display, or any type of computing device or display device that may communicate with the server 1006 by way of the network 720. The playback computing device 722 may include a physical processor (e.g., physical processor 1070), which may represent a single processor or multiple processors, and one or more memory devices (e.g., memory 1044), which may store instructions (e.g., software applications) and/or data in one or more modules 1046. The modules 1046 may store software instructions, along with data (e.g., input and/or output data) processed by execution of those instructions.

The playback computing device 722 may be (represent) a computing device of a user. The playback computing device 722 may receive encoded media content from the server 1006 by way of the network 720 for display on the display device 724. In some implementations, the playback computing device 722 may store the received encoded media content in a content storage repository 1056 for later playing (displaying) on the display device 724. In some implementations, the received media content may be played (displayed) on the display device 724 as it is received from the server 1006 (e.g., the received media content is streamed to the display device 724). A playback application 1050 may include hardware and/or software for displaying (playing) the received media content on the display device 724 for viewing by the user.

In some implementations, the playback application 1050 may include hardware and/or software for interpreting transcoded and/or compress media content when providing the media content for displaying (playing) on the display device 724. One or more audio device(s) 1054 may include hardware and/or software for playing audio media content (e.g., one or more speakers) and/or for recording audio media content (e.g., one or more microphones). An orientation module 1052 may include hardware and/or software for determining an orientation (e.g., vertical, horizontal, portrait, landscape) of the playback computing device 722. For example, the orientation module 1052 may include one or more sensors that may include, but are not limited to, accelerometers, gyroscopes, magnetometers, and other suitable types of sensors that may be used to detect and/or determine an orientation of the playback computing device 722.

A communication module 1048 may include hardware and/or software for establishing a connection to the server 1006 by way of the network 720, for example, by interfacing with the communication module 924 included in the modules 920. The playback computing device 722 may be communicatively coupled to server 1006 through the network 720. The network 720 may be any communication network, such as the Internet, a Wide Area Network (WAN), or a Local Area Network (LAN), and may include various types of communication protocols and physical connections.

Figure 11:
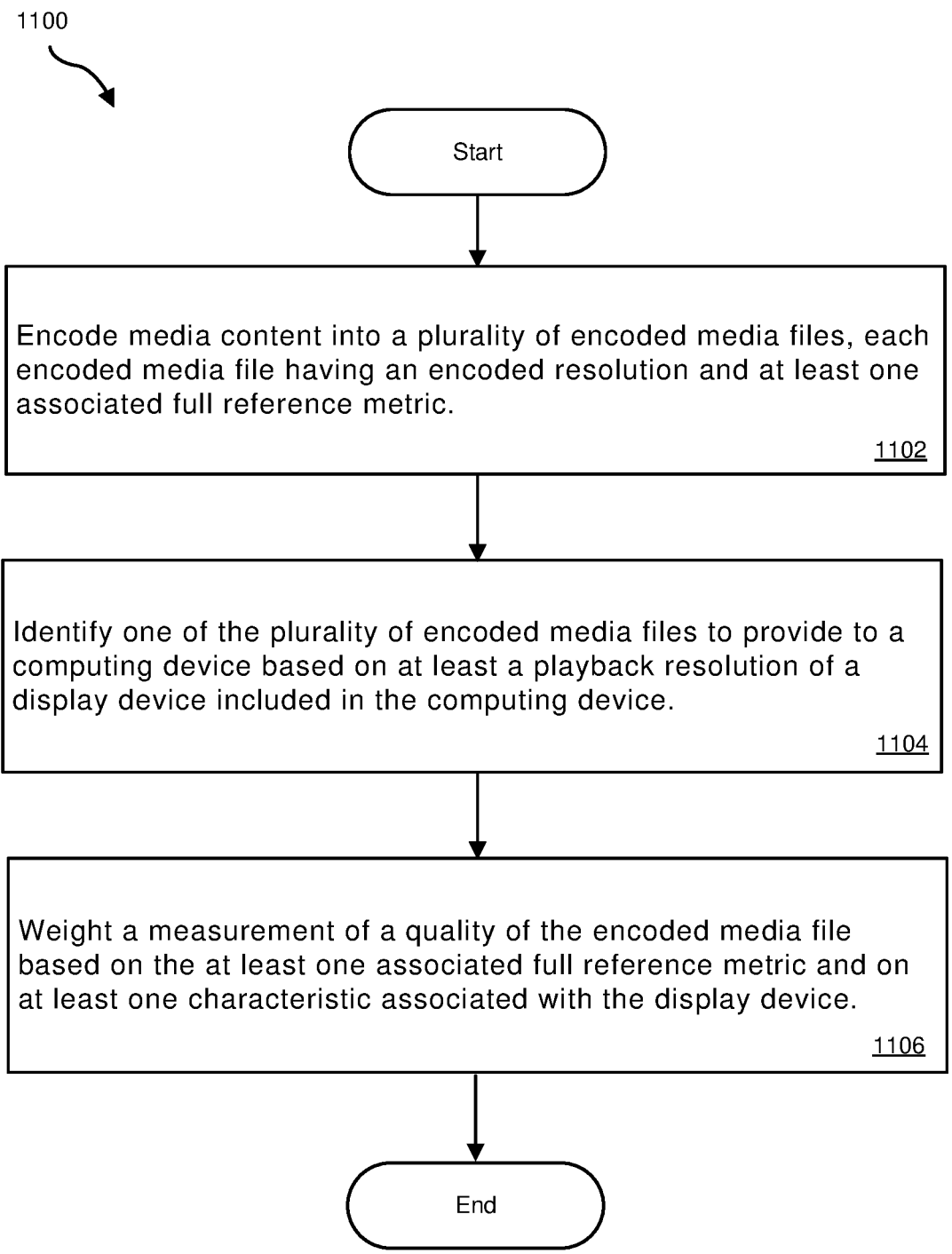
FIG. 11 is a flow diagram of an exemplary computer-implemented method for measuring image quality based on an image quality metric.

FIG. 11 is a flow diagram of an exemplary computer-implemented method 1100 for measuring image quality based on an image quality metric. The steps shown in FIG. 11 may be performed by any suitable computer-executable code and/or computing system, including the system(s) illustrated in FIGS. 6, 7, 9, and 10. In one example, each of the steps shown in FIG. 11 may represent an algorithm whose structure includes and/or is represented by multiple sub-steps, examples of which will be provided in greater detail below.

As illustrated in FIG. 11, at step 1102 one or more of the systems described herein may encode media content into a plurality of encoded media files, each encoded media file having an encoded resolution and at least one associated full reference metric. For example, the encoding module 630 may encode media content into one or more progressive scanned encodings (e.g., encodings 604a-e) and into a 4k resolution encoding 604f.

The systems described herein may perform step 1102 in a variety of ways. In one example, the encoding module 630 may encode media content into one or more progressive scanned encodings (e.g., encodings 604a-e) and into a 4k resolution encoding 604f for storage in the encoded content storage 638.

As illustrated in FIG. 11, at step 1104 one or more of the systems described herein may identify one of the plurality of encoded media files to provide to a computing device based on at least a playback resolution of a display device included in the computing device. For example, an adaptive bitrate module 634 may determine a playback resolution of a display device (e.g., the display device 724) included in the playback computing device 722.

The systems described herein may perform step 1104 in a variety of ways. In one example, the adaptive bitrate module 634, based on determining a playback resolution of a display device (e.g., the display device 724) included in the playback computing device 722, may identify one of the encodings 604a-f to provide to the playback computing device 722 as described herein.

As illustrated in FIG. 11, at step 1106 one or more of the systems described herein may weight a measurement of a quality of the encoded media file based on the at least one associated full reference metric and on at least one characteristic associated with the display device. For example, the weighting module 708 included in the encoding mean opinion score module 704 may determine (calculate) a weight for use in weighting the measurement of the quality of the encoded media file delivered to the playback computing device 722.

The systems described herein may perform step 1106 in a variety of ways. In one example, the MS-SSIM module 706 may determine (calculate) a weighted MS-SSIM index for an encoding based on a full reference metric associated with the encoding and weightings determined (calculated) by the weighting module 708. The encoding mean opinion score module 704 may apply the weighted MS-SSIM index determined (calculated) by the MS-SSIM module 706 to the encoding as a score of a perceived image quality for the encoding that is weighted based on one or more characteristics of the display device 724, one or more characteristics of the playback computing device 722, and a viewing distance of a user to the display device 724, as disclosed herein.

EXAMPLE EMBODIMENTS

Example 1: A computer-implemented method may include encoding media content into a plurality of encoded media files, each encoded media file having an encoded resolution and at least one associated full reference metric, identifying one of the plurality of encoded media files to provide to a computing device based on at least a playback resolution of a display device included in the computing device, and weighting a measurement of a quality of the encoded media file based on the at least one associated full reference metric and on at least one characteristic associated with the display device.

Example 2: The computer-implemented method of Example 1, where a characteristic associated with the display device may be a pixel density of the display device.

Example 3: The computer-implemented method of any of Examples 1 and 2, where a characteristic associated with the display device may be a viewing distance of a user to the display device.

Example 4: The computer-implemented method of any of Examples 1-3, further including performing the measurement of the quality of the encoded media file at multiple scales, and where, at each scale, weighting the measurement of the quality of the encoded media file may further include calculating a spatial frequency associated with the computing device, determining a contrast sensitivity associated with the spatial frequency, and weighting the measurement at the scale based on the contrast sensitivity.

Example 5: The computer-implemented method of any of Examples 1-4, where the at least one associated full reference metric may be a structural similarity index.

Example 6: The computer-implemented method of Example 5, further including performing the measurement of the quality of the encoded media file at multiple scales, each scale being a down sample of the encoded resolution, and generating a multi-scale structural similarity index.

Example 7: The computer-implemented method of any of Examples 5 and 6, where a spatial frequency may be associated with each scale of the multiple scales, and where weighting the measurement of the quality of the encoded media file may include weighting each scale of the multi-scale structural similarity index based on a contrast sensitivity for the spatial frequency associated with the scale.

Example 8: The computer-implemented method of any of Examples 1-7, where identifying the encoded media file to provide to the computing device may be further based on a frame rate for playback of the encoded media file on the display device.

Example 9: A system may include at least one physical processor, and physical memory including computer-executable instructions that, when executed by the physical processor, cause the physical processor to encode media content into a plurality of encoded media files, each encoded media file having an encoded resolution and at least one associated full reference metric, identify one of the plurality of encoded media files to provide to a computing device based on at least a playback resolution of a display device included in the computing device, and weight a measurement of a quality of the encoded media file based on the at least one associated full reference metric and on at least one characteristic associated with the display device.

Example 10: The system of Example 9, where a characteristic associated with the display device may be a pixel density of the display device.

Example 11: The system of any of Examples 9 and 10, where a characteristic associated with the display device may be a viewing distance of a user to the display device.

Example 12: The system of any of Examples 9-11, where the computer-executable instructions further cause the physical processor to perform the measurement of the quality of the encoded media file at multiple scales, and where, at each scale, the computer-executable instructions that cause the physical processor to weight the measurement of the quality of the encoded media file may further include instructions that cause the physical processor to calculate a spatial frequency associated with the computing device, determine a contrast sensitivity associated with the spatial frequency, and weight the measurement at the scale based on the contrast sensitivity.

Example 13: The system of any of Examples 9-12, where the at least one associated full reference metric may be a structural similarity index.

Example 14: The system of Example 13, where the computer-executable instructions further cause the physical processor to perform the measurement of the quality of the encoded media file at multiple scales, each scale being a down sample of the encoded resolution, and generate a multi-scale structural similarity index.

Example 15: The system of any of Examples 13 and 14, where a spatial frequency may be associated with each scale of the multiple scales, and where the computer-executable instructions that cause the physical processor to weight the measurement of the quality of the encoded media file may further include instructions that cause the physical processor to weight each scale of the multi-scale structural similarity index based on a contrast sensitivity for the spatial frequency associated with the scale.

Example 16: The system of any of Examples 9-15, where identifying the encoded media file to provide to the computing device may be further based on a frame rate for playback of the encoded media file on the display device.

Example 17: A non-transitory computer-readable medium may include one or more computer-executable instructions that, when executed by at least one processor of a computing system, may cause the computing system to encode media content into a plurality of encoded media files, each encoded media file having an encoded resolution and at least one associated full reference metric, identify one of the plurality of encoded media files to provide to a computing device based on at least a playback resolution of a display device included in the computing device, and weight a measurement of a quality of the encoded media file based on the at least one associated full reference metric and on at least one characteristic associated with the display device.

Example 18: The non-transitory computer-readable medium of Example 17, where a characteristic associated with the display device may be a pixel density of the display device.

Example 19: The non-transitory computer-readable medium of any of Examples 17 and 18, where a characteristic associated with the display device may be a viewing distance of a user to the display device.

Example 20: The cyst non-transitory computer-readable medium of any of Examples 17-19, where one or more of the computer-executable instructions further cause the computing system to perform the measurement of the quality of the encoded media file at multiple scales, and where, at each scale, the one or more computer-executable instructions that cause the computing system to weight the measurement of the quality of the encoded media file may further cause the computing system to calculate a spatial frequency associated with the computing device, determine a contrast sensitivity associated with the spatial frequency, and weight the measurement at the scale based on the contrast sensitivity.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 1200 in FIG. 12. Other artificial-reality systems may include an NED that also provides visibility into the real world (e.g., augmented-reality system 1300 in FIG. 13) or that visually immerses a user in an artificial reality (e.g., virtual-reality system 1400 in FIG. 14). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 12:
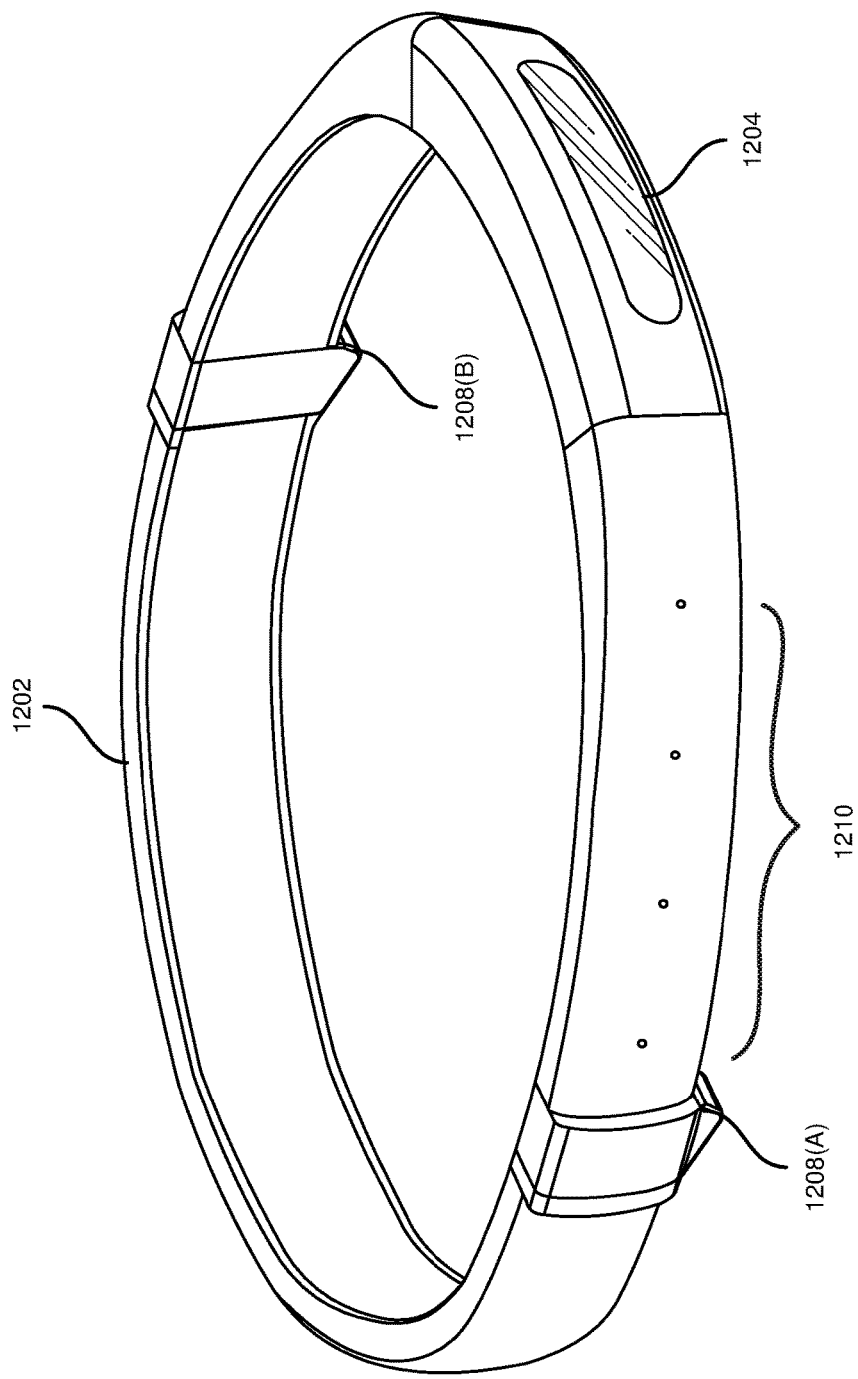
FIG. 12 is an illustration of an exemplary artificial-reality headband that may be used in connection with embodiments of this disclosure.

Turning to FIG. 12, augmented-reality system 1200 generally represents a wearable device dimensioned to fit about a body part (e.g., a head) of a user. As shown in FIG. 12, system 1200 may include a frame 1202 and a camera assembly 1204 that is coupled to frame 1202 and configured to gather information about a local environment by observing the local environment. Augmented-reality system 1200 may also include one or more audio devices, such as output audio transducers 1208(A) and 1208(B) and input audio transducers 1210. Output audio transducers 1208(A) and 1208(B) may provide audio feedback and/or content to a user, and input audio transducers 1210 may capture audio in a user's environment.

As shown, augmented-reality system 1200 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 1200 may not include an NED, augmented-reality system 1200 may include other types of screens or visual feedback devices (e.g., a display screen integrated into a side of frame 1202).

Figure 13:
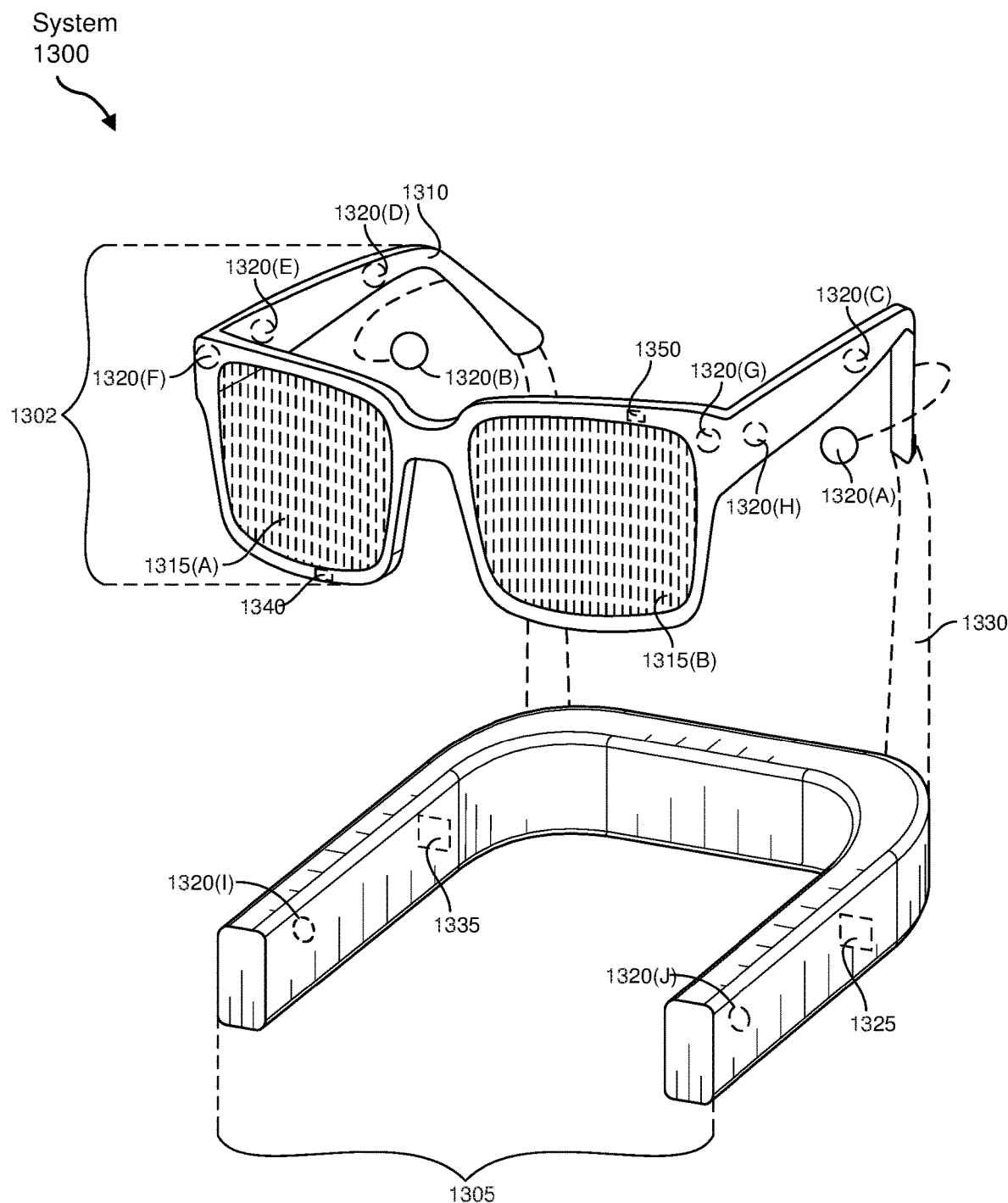
FIG. 13 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 13, augmented-reality system 1300 may include an eyewear device 1302 with a frame 1310 configured to hold a left display device 1315(A) and a right display device 1315(B) in front of a user's eyes. Display devices 1315(A) and 1315(B) may act together or independently to present an image or series of images to a user. While augmented-reality system 1300 includes two displays, embodiments of this disclosure may be implemented in augmented-reality systems with a single NED or more than two NEDs.

In some embodiments, augmented-reality system 1300 may include one or more sensors, such as sensor 1340. Sensor 1340 may generate measurement signals in response to motion of augmented-reality system 1300 and may be located on substantially any portion of frame 1310. Sensor 1340 may represent a position sensor, an inertial measurement unit (IMU), a depth camera assembly, or any combination thereof. In some embodiments, augmented-reality system 1300 may or may not include sensor 1340 or may include more than one sensor. In embodiments in which sensor 1340 includes an IMU, the IMU may generate calibration data based on measurement signals from sensor 1340. Examples of sensor 1340 may include, without limitation, accelerometers, gyroscopes, magnetometers, other suitable types of sensors that detect motion, sensors used for error correction of the IMU, or some combination thereof. Augmented-reality system 1300 may also include a microphone array with a plurality of acoustic transducers 1320 (A)-1320(J), referred to collectively as acoustic transducers 1320. Acoustic transducers 1320 may be transducers that detect air pressure variations induced by sound waves. Each acoustic transducer 1320 may be configured to detect sound and convert the detected sound into an electronic format (e.g., an analog or digital format). The microphone array in FIG. 2 may include, for example, ten acoustic transducers: 1320(A) and 1320(B), which may be designed to be placed inside a corresponding ear of the user, acoustic transducers 1320(C), 1320(D), 1320(E), 1320(F), 1320(G), and 1320 (H), which may be positioned at various locations on frame 1310, and/or acoustic transducers 1320(I) and 1320(J), which may be positioned on a corresponding neckband 1305.

In some embodiments, one or more of acoustic transducers 1320(A)-(F) may be used as output transducers (e.g., speakers). For example, acoustic transducers 1320(A) and/ or 1320(B) may be earbuds or any other suitable type of headphone or speaker.

The configuration of acoustic transducers 1320 of the microphone array may vary. While augmented-reality system 1300 is shown in FIG. 13 as having ten acoustic transducers 1320, the number of acoustic transducers 1320 may be greater or less than ten. In some embodiments, using higher numbers of acoustic transducers 1320 may increase the amount of audio information collected and/or the sensitivity and accuracy of the audio information. In contrast, using a lower number of acoustic transducers 1320 may decrease the computing power required by an associated controller 1350 to process the collected audio information. In addition, the position of each acoustic transducer 1320 of the microphone array may vary. For example, the position of an acoustic transducer 1320 may include a defined position on the user, a defined coordinate on frame 1310, an orientation associated with each acoustic transducer 1320, or some combination thereof.

Acoustic transducers 1320(A) and 1320(B) may be positioned on different parts of the user's ear, such as behind the pinna or within the auricle or fossa. Or, there may be additional acoustic transducers 1320 on or surrounding the ear in addition to acoustic transducers 1320 inside the ear canal. Having an acoustic transducer 1320 positioned next to an ear canal of a user may enable the microphone array to collect information on how sounds arrive at the ear canal. By positioning at least two of acoustic transducers 1320 on either side of a user's head (e.g., as binaural microphones), augmented-reality device 1300 may simulate binaural hearing and capture a 3D stereo sound field around about a user's head. In some embodiments, acoustic transducers 1320(A) and 1320(B) may be connected to augmented-reality system 1300 via a wired connection 1330, and in other embodiments, acoustic transducers 1320(A) and 1320(B) may be connected to augmented-reality system 1300 via a wireless connection (e.g., a Bluetooth connection). In still other embodiments, acoustic transducers 1320(A) and 1320(B) may not be used at all in conjunction with augmented-reality system 1300.

Acoustic transducers 1320 on frame 1310 may be positioned along the length of the temples, across the bridge, above or below display devices 1315(A) and 1315(B), or some combination thereof. Acoustic transducers 1320 may be oriented such that the microphone array is able to detect sounds in a wide range of directions surrounding the user wearing the augmented-reality system 1300. In some embodiments, an optimization process may be performed during manufacturing of augmented-reality system 1300 to determine relative positioning of each acoustic transducer 1320 in the microphone array.

In some examples, augmented-reality system 1300 may include or be connected to an external device (e.g., a paired device), such as neckband 1305. Neckband 1305 generally represents any type or form of paired device. Thus, the following discussion of neckband 1305 may also apply to various other paired devices, such as charging cases, smart watches, smart phones, wrist bands, other wearable devices, hand-held controllers, tablet computers, laptop computers and other external compute devices, etc.

As shown, neckband 1305 may be coupled to eyewear device 1302 via one or more connectors. The connectors may be wired or wireless and may include electrical and/or non-electrical (e.g., structural) components. In some cases, eyewear device 1302 and neckband 1305 may operate independently without any wired or wireless connection between them. While FIG. 13 illustrates the components of eyewear device 1302 and neckband 1305 in example locations on eyewear device 1302 and neckband 1305, the components may be located elsewhere and/or distributed differently on eyewear device 1302 and/or neckband 1305. In some embodiments, the components of eyewear device 1302 and neckband 1305 may be located on one or more additional peripheral devices paired with eyewear device 1302, neckband 1305, or some combination thereof.

Pairing external devices, such as neckband 1305, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1300 may be provided by a paired device or shared between a paired device and an eyewear device, thus reducing the weight, heat profile, and form factor of the eyewear device overall while still retaining desired functionality. For example, neckband 1305 may allow components that would otherwise be included on an eyewear device to be included in neckband 1305 since users may tolerate a heavier weight load on their shoulders than they would tolerate on their heads. Neckband 1305 may also have a larger surface area over which to diffuse and disperse heat to the ambient environment. Thus, neckband 1305 may allow for greater battery and computation capacity than might otherwise have been possible on a stand-alone eyewear device. Since weight carried in neckband 1305 may be less invasive to a user than weight carried in eyewear device 1302, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1305 may be communicatively coupled with eyewear device 1302 and/or to other devices. These other devices may provide certain functions (e.g., tracking, localizing, depth mapping, processing, storage, etc.) to augmented-reality system 1300. In the embodiment of FIG. 13, neckband 1305 may include two acoustic transducers (e.g., 1320(1) and 1320(J)) that are part of the microphone array (or potentially form their own microphone subarray). Neckband 1305 may also include a controller 1325 and a power source 1335.

Acoustic transducers 1320(1) and 1320(J) of neckband 1305 may be configured to detect sound and convert the detected sound into an electronic format (analog or digital). In the embodiment of FIG. 13, acoustic transducers 1320(1) and 1320(J) may be positioned on neckband 1305, thereby increasing the distance between the neckband acoustic transducers 1320(1) and 1320(J) and other acoustic transducers 1320 positioned on eyewear device 1302. In some cases, increasing the distance between acoustic transducers 1320 of the microphone array may improve the accuracy of beamforming performed via the microphone array. For example, if a sound is detected by acoustic transducers 1320(C) and 1320(D) and the distance between acoustic transducers 1320(C) and 1320(D) is greater than, e.g., the distance between acoustic transducers 1320(D) and 1320(E), the determined source location of the detected sound may be more accurate than if the sound had been detected by acoustic transducers 1320(D) and 1320(E).

Controller 1325 of neckband 1305 may process information generated by the sensors on neckband 1305 and/or augmented-reality system 1300. For example, controller 1325 may process information from the microphone array that describes sounds detected by the microphone array. For each detected sound, controller 1325 may perform a direction-of-arrival (DOA) estimation to estimate a direction from which the detected sound arrived at the microphone array. As the microphone array detects sounds, controller 1325 may populate an audio data set with the information. In embodiments in which augmented-reality system 1300 includes an inertial measurement unit, controller 1325 may compute all inertial and spatial calculations from the IMU located on eyewear device 1302. A connector may convey information between augmented-reality system 1300 and neckband 1305 and between augmented-reality system 1300 and controller 1325. The information may be in the form of optical data, electrical data, wireless data, or any other transmittable data form. Moving the processing of information generated by augmented-reality system 1300 to neckband 1305 may reduce weight and heat in eyewear device 1302, making it more comfortable to the user.

Power source 1335 in neckband 1305 may provide power to eyewear device 1302 and/or to neckband 1305. Power source 1335 may include, without limitation, lithium ion batteries, lithium-polymer batteries, primary lithium batteries, alkaline batteries, or any other form of power storage. In some cases, power source 1335 may be a wired power source. Including power source 1335 on neckband 1305 instead of on eyewear device 1302 may help better distribute the weight and heat generated by power source 1335.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1400 in FIG. 14, that mostly or completely covers a user's field of view. Virtual-reality system 1400 may include a front rigid body 1402 and a band 1404 shaped to fit around a user's head. Virtual-reality system 1400 may also include output audio transducers 1406(A) and 1406(B). Furthermore, while not shown in FIG. 14, front rigid body 1402 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 1300 and/or virtual-reality system 1400 may include one or more liquid crystal displays (LCDs), light emitting diode (LED) displays, organic LED (OLED) displays digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 1300 and/or virtual-reality system 1400 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguides components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system 1200, augmented-reality system 1300, and/or virtual-reality system 1400 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 12 and 14, output audio transducers 1208(A), 1208(B), 1406(A), and 1406(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1210 may include condenser microphones, dynamic microphones, ribbon microphones, and/or any other type or form of input transducer. In some embodiments, a single transducer may be used for both audio input and audio output.

Figure 14:
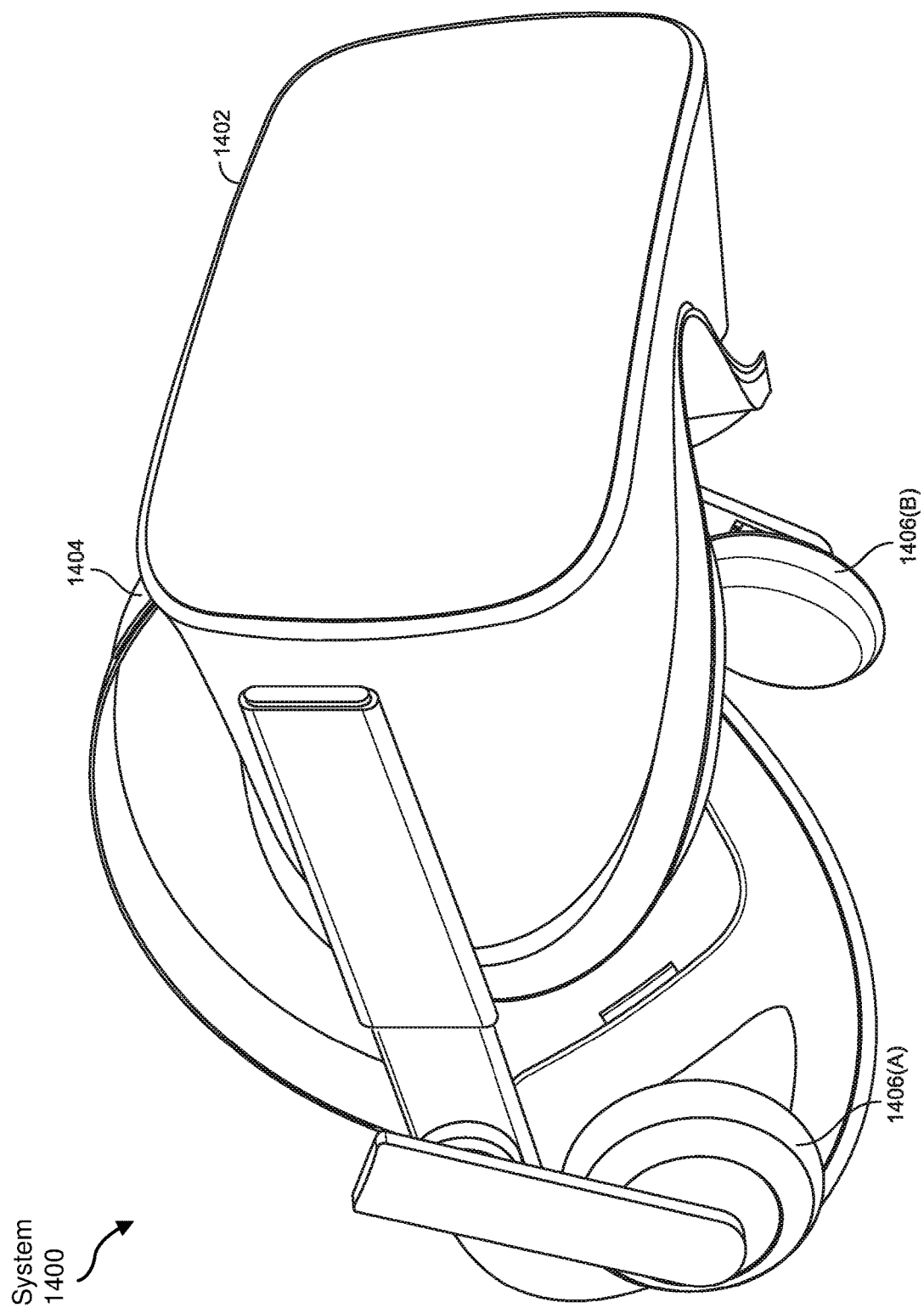
FIG. 14 is an illustration of an exemplary virtual-reality headset that may be used in connection with embodiments of this disclosure.

While not shown in FIGS. 12-14, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   encoding media content into a plurality of encoded media files, each encoded media file having an encoded resolution and at least one associated full reference metric comprising a structural similarity index;
   identifying one of the plurality of encoded media files to provide to a computing device based on at least a playback resolution of a display device included in the computing device;
   measuring a quality of the encoded media file at multiple scales, wherein each scale of the multiple scales:
      comprises a down sample of the encoded resolution; and
      has an associated spatial frequency;
   generating a multi-scale structural similarity (MS-SSIM) index; and
   weighting the measurement of the quality of the encoded media file based on the at least one associated full reference metric and on at least one characteristic associated with the display device by weighting each scale of the MS-SSIM index based on a contrast sensitivity for the spatial frequency associated with the scale.

2. The computer-implemented method of claim 1, wherein a characteristic associated with the display device is a pixel density of the display device.

3. The computer-implemented method of claim 1, wherein a characteristic associated with the display device is a viewing distance of a user to the display device.

4. The computer-implemented method of claim 1,
   wherein, at each scale, weighting the measurement of the quality of the encoded media file further comprises:
      calculating the spatial frequency associated with the computing device; and
      determining the contrast sensitivity associated with the spatial frequency.

5. The computer-implemented method of claim 1, wherein identifying the encoded media file to provide to the computing device is further based on a frame rate for playback of the encoded media file on the display device.

6. A system comprising:
   at least one physical processor; and
   physical memory comprising computer-executable instructions that, when executed by the physical processor, cause the physical processor to:
      encode media content into a plurality of encoded media files, each encoded media file having an encoded resolution and at least one associated full reference metric comprising a structural similarity index;
      identify one of the plurality of encoded media files to provide to a computing device based on at least a playback resolution of a display device included in the computing device;
      measure a quality of the encoded media file at multiple scales, wherein each scale of the multiple scales:
         comprises a down sample of the encoded resolution; and
         has an associated spatial frequency;
      generate a multi-scale structural similarity (MS-SSIM) index; and
      weight the measurement of the quality of the encoded media file based on the at least one associated full reference metric and on at least one characteristic associated with the display device by weighting each scale of the MS-SSIM index based on a contrast sensitivity for the spatial frequency associated with the scale.

7. The system of claim 6, wherein a characteristic associated with the display device is a pixel density of the display device.

8. The system of claim 6, wherein a characteristic associated with the display device is a viewing distance of a user to the display device.

9. The system of claim 6,
   wherein, at each scale, the computer-executable instructions that cause the physical processor to weigh the measurement of the quality of the encoded media file further include instructions that cause the physical processor to:

calculate the spatial frequency associated with the computing device; and determine the contrast sensitivity associated with the spatial frequency.

10. The system of claim 6, wherein identifying the encoded media file to provide to the computing device is further based on a frame rate for playback of the encoded media file on the display device.

11. A non-transitory computer-readable medium comprising one or more computer-executable instructions that, when executed by at least one processor of a computing system, cause the computing system to:

encode media content into a plurality of encoded media files, each encoded media file having an encoded resolution and at least one associated full reference metric comprising a structural similarity index;

identify one of the plurality of encoded media files to provide to a computing device based on at least a playback resolution of a display device included in the computing device;

measuring a quality of the encoded media file at multiple scales, wherein each scale of the multiple scales:

comprises a down sample of the encoded resolution; and has an associated spatial frequency;

generating a multi-scale structural similarity (MS-SSIM) index; and weight a measurement of a quality of the encoded media file based on the at least one associated full reference metric and on at least one characteristic associated with the display device by weighting each scale of the MS-SSIM index based on a contrast sensitivity for the spatial frequency associated with the scale.

12. The non-transitory computer-readable medium of claim 11, wherein a characteristic associated with the display device is a pixel density of the display device.

13. The non-transitory computer-readable medium of claim 11, wherein a characteristic associated with the display device is a viewing distance of a user to the display device.

14. The non-transitory computer-readable medium of claim 11, wherein, at each scale, the one or more computer-executable instructions that cause the computing system to weight the measurement of the quality of the encoded media file further cause the computing system to:

calculate the spatial frequency associated with the computing device; and determine the contrast sensitivity associated with the spatial frequency.

15. The computer-implemented method of claim 1, wherein a characteristic associated with the display device is a pixel resolution of the display device.

16. The computer-implemented method of claim 1, wherein a characteristic associated with the display device is an orientation of the display device.

17. The computer-implemented method of claim 1, wherein identifying the encoded media file to provide to the computing device is further based on a bandwidth of a communication connection of the display device.

18. The system of claim 6, wherein a characteristic associated with the display device is a pixel resolution of the display device.

19. The system of claim 6, wherein a characteristic associated with the display device is an orientation of the display device.

20. The system of claim 6, wherein identifying the encoded media file to provide to the computing device is further based on a bandwidth of a communication connection of the display device.

* * * * *